(12) United States Patent
Ramer et al.

(10) Patent No.: US 10,177,848 B1
(45) Date of Patent: Jan. 8, 2019

(54) VISUAL LIGHT COMMUNICATION USING STARBURST OR HAZE OF THE LIGHT SOURCE

(71) Applicant: ABL IP HOLDING LLC, Conyers, GA (US)

(72) Inventors: David P. Ramer, Reston, VA (US); Nathaniel W. Hixon, Arlington, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/675,111

(22) Filed: Aug. 11, 2017

(51) Int. Cl.
*H04B 10/116* (2013.01)
*H04N 5/235* (2006.01)
*H04B 10/60* (2013.01)
*H04B 10/50* (2013.01)
*H04B 10/524* (2013.01)

(52) U.S. Cl.
CPC ......... *H04B 10/116* (2013.01); *H04N 5/2353* (2013.01); *H04B 10/501* (2013.01); *H04B 10/524* (2013.01); *H04B 10/60* (2013.01)

(58) Field of Classification Search
CPC .. H04B 10/116; H04B 10/524; H04B 10/501; H04B 10/60; H04N 5/2353
USPC ......................................................... 398/130
See application file for complete search history.

(56) References Cited

U.S. PATENT DOCUMENTS

| | | | |
|---|---|---|---|
| 2013/0028612 A1 | 1/2013 | Ryan et al. | |
| 2014/0240492 A1* | 8/2014 | Lee ...................... | H04N 5/2256 348/136 |
| 2014/0321859 A1* | 10/2014 | Guo ..................... | H04B 10/116 398/118 |
| 2015/0098709 A1* | 4/2015 | Breuer .................... | G01C 3/08 398/118 |
| 2016/0119590 A1* | 4/2016 | Ganick .................... | G01S 1/70 348/61 |
| 2016/0323035 A1 | 11/2016 | Jovicic et al. | |
| 2017/0244482 A1 | 8/2017 | Dimare et al. | |

* cited by examiner

*Primary Examiner* — Juan A Torres
(74) *Attorney, Agent, or Firm* — RatnerPrestia

(57) ABSTRACT

A system, method and portable device are provided in which rolling shutter images containing visible light communication (VLC) transmissions from one or more light sources carrying information data in dark or low surrounding lighting in an indoor or outdoor setting are captured. The captured rolling shutter images are analyzed to determine whether the modulated visible light output from the light devices is a predetermined size within the captured rolling shutter image. When the modulated visible light output is not the predetermined size, adjustments are made to settings of the image sensor to scatter, defocus or overexpose the image to cause the modulated visible light output in a new captured rolling shutter image to be at least the predetermined size. The modulated visible light output of the predetermined size or larger is decoded to provide information data for a communication application.

22 Claims, 14 Drawing Sheets

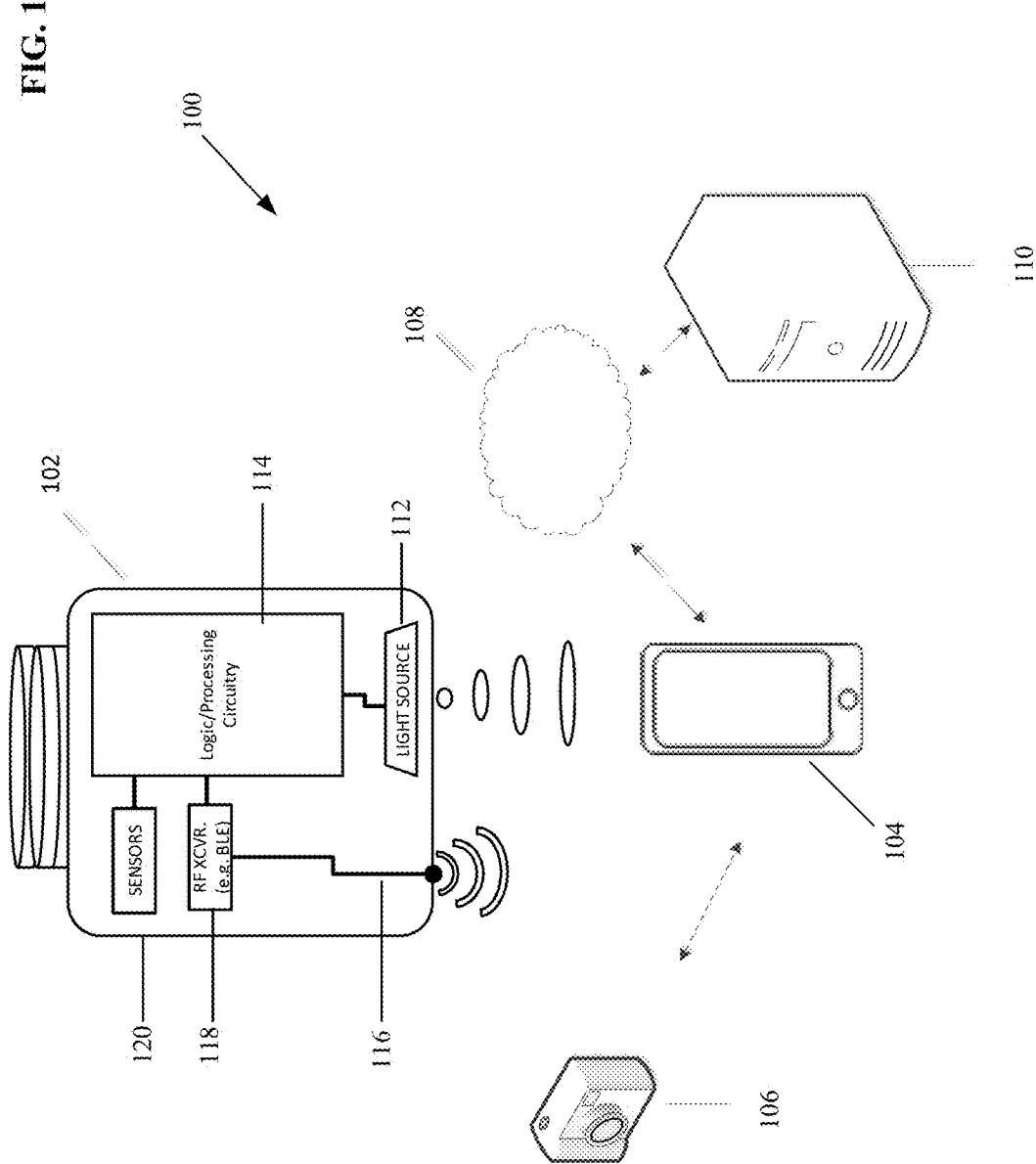

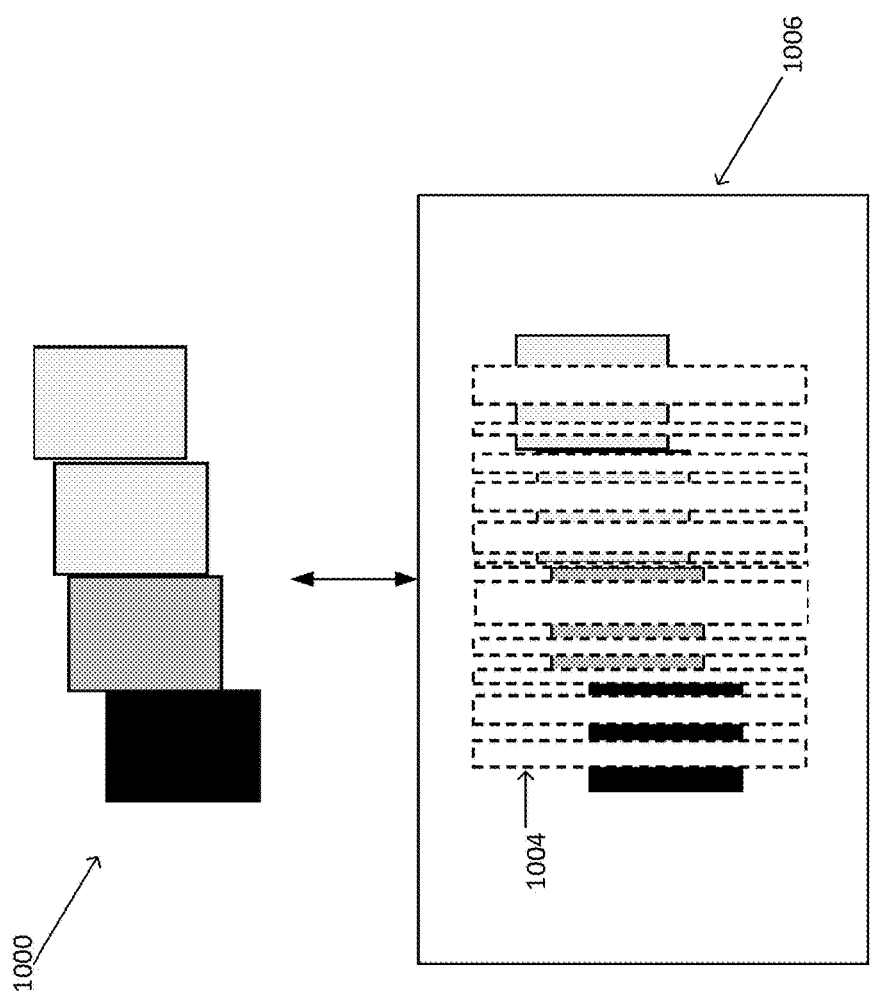

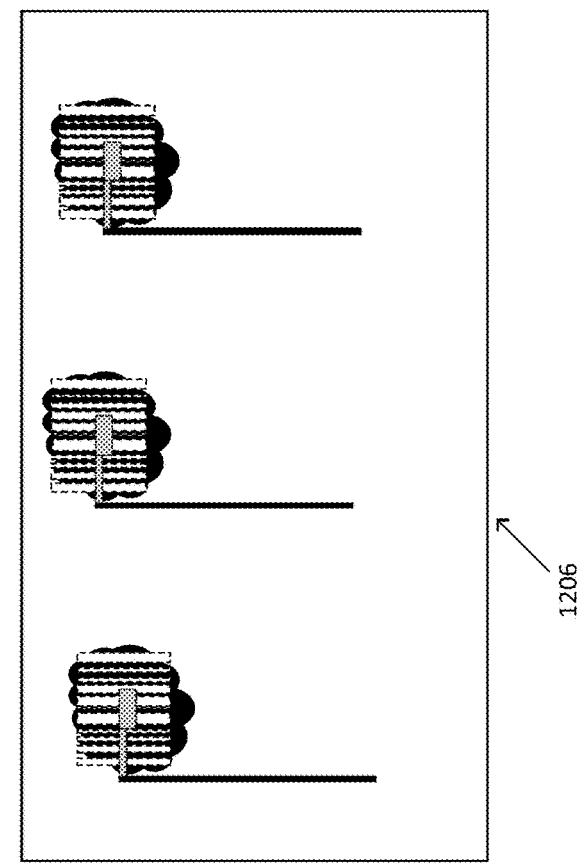
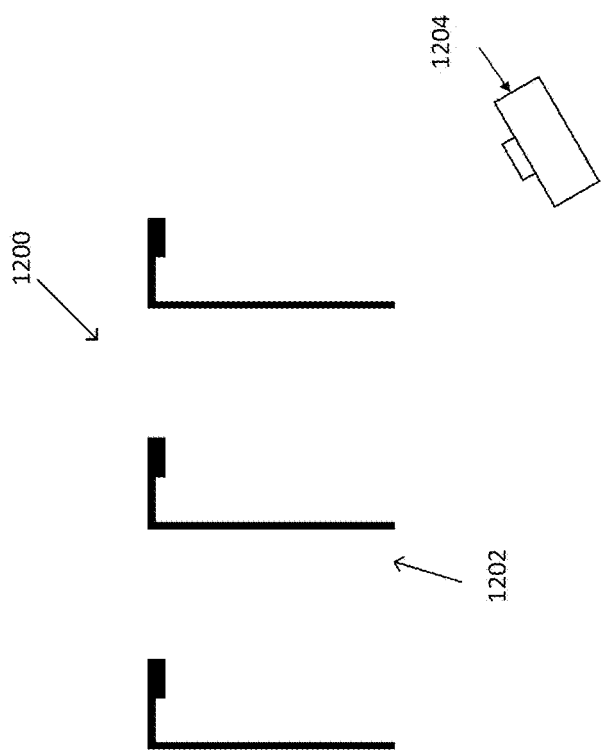
FIG. 12B
FIG. 12A

VISUAL LIGHT COMMUNICATION USING STARBURST OR HAZE OF THE LIGHT SOURCE

TECHNICAL FIELD

The present subject matter relates to techniques and equipment for acquiring visual light communication (VLC) transmission information in indoor and outdoor settings having low or dark lighting.

BACKGROUND

In recent years, the use of mobile devices, particularly smartphones and tablets, has grown significantly. A number of techniques have been proposed and several systems have been developed and deployed using visual light communication (VLC) from lighting devices to provide information to the mobile devices, for example, to allow the mobile devices to determine estimates of their respective positions in a venue illuminated by the lighting devices and to utilize information about the identified location to assist a user of the mobile device. For example, the mobile device may display a map of an area in which the mobile device user is currently located as well as an indication of the user's location on the map. In this way, the user may utilize the mobile device as a navigational tool, for example.

Traditionally, a mobile device may use location identification services such as Global Positioning System (GPS) or cellular communications to help identify a current location of the mobile device. However, GPS and cellular communications may not provide sufficient information when the mobile device is located within a building, and suffer from multi-path propagation effects that make it unsuitable for indoor environments. More recently, the mobile device may use Wi-Fi and/or other radio frequency (RF) technologies (e.g., Bluetooth, Near-Field Communications (NFC), etc.) to help identify the current location of the mobile device within a building. But such Wi-Fi and RF based solutions may be slow and may require that additional infrastructure, such as hotspots or beacons, be added within the building. This additional infrastructure has additional costs that may not be outweighed by any benefit provided to the user of the mobile device. There are advantages of VLC or other light based positioning over other mobile device position determination technologies, particularly for indoor position determinations. For example, optical techniques, such as VLC, are more accurate and/or reliable since light waves are highly directional and do not pass through most materials. Therefore, a light-detecting device can be presumed proximate to a light source if the source is robustly detectable. Additionally, the location identification services have most often been useful in bright, well-lit environments.

VLC transmissions from lighting devices may have communication applications instead of or in addition to transmitting data for use in position estimation. VLC transmissions, for example, may carry text information about items of interest or services available in the venue. For most mobile device applications, reception of VLC relies on a rolling shutter camera normally included in the mobile device to capture images of light sources. The circuitry of the mobile device processes the images to detect data modulated on the light output from the light sources.

A need exists for providing improved VLC reception in a dark or low surrounding light setting within a building or outdoors at dusk/night with minimal delay and without requiring additional infrastructure.

SUMMARY

The concepts disclosed herein alleviate the above noted problems with detection and analysis of visible light communication (VLC) transmissions in indoor and outdoor settings having low or dark surrounding lighting.

A system, method and portable handheld device are provided in which rolling shutter images containing visible light communication (VLC) transmissions from one or more light sources carrying information data in dark or low surrounding lighting in an indoor or outdoor setting are captured. The captured rolling shutter images are analyzed to determine whether the modulated visible light output from the light sources is a predetermined size within the captured rolling shutter image. When the modulated visible light output is not the predetermined size, adjustments are made to at least one of a lens, a shutter, an optical element or material, to scatter, defocus or overexpose the image to cause the modulated visible light output in a captured rolling shutter image to be at least the predetermined size. The modulated visible light output of the predetermined size or larger is decoded to provide information data for a communication application.

The predetermined size is a measurement in which the image data of the captured rolling shutter image is equal to a perimeter of a fixture of the lighting device and the modulated visible light output within the captured rolling shutter image includes a full frame of data. When the image data of the modulated visible light output of the light source is not the predetermined size, a determination is made of at least one of the image data of the captured rolling shutter image is less than or greater than a perimeter of the fixture of the lighting device or the modulated visible light input within the captured rolling shutter image does not include a full frame of data. Adjusting a setting of the image sensor when the modulated visible light output is not the predetermined size causes the new captured rolling shutter image to be greater than the perimeter of the fixture of the lighting device.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 1 is a simplified block diagram of a system utilizing a lighting device to communicate information to a mobile device.

FIG. 10 illustrates an example of the optical effect of internal reflection of the lens utilized for Visible Light Communication data detection from a rolling shutter image.

FIGS. 12A and 12B illustrate an example of simultaneously obtaining rolling shutter images of VLC encoded light from multiple light sources, and determining when the captured image data is ready for decoding.

DETAILED DESCRIPTION

Figure 2B:
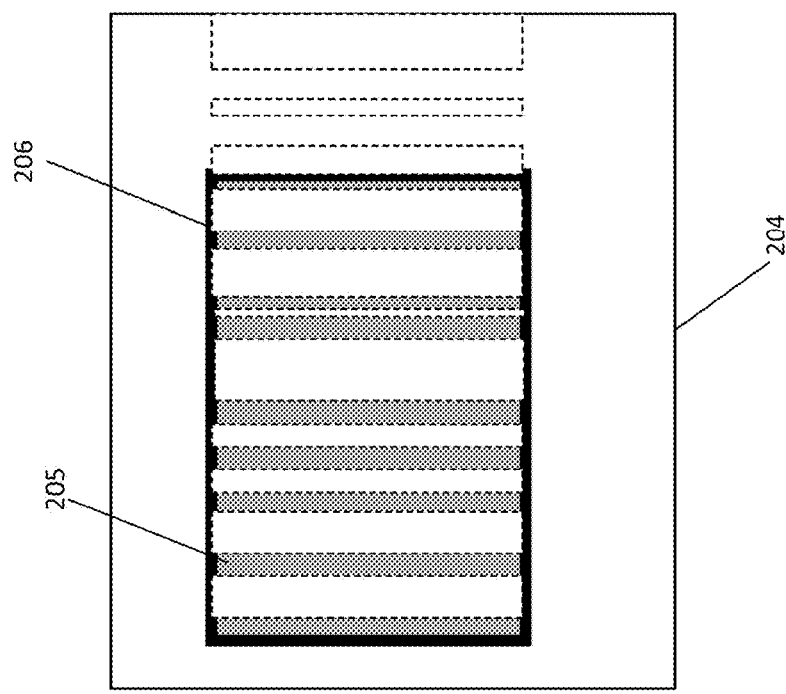
FIGS. 2A and 2B illustrate images containing Visible Light Communication (VLC) transmissions data from a rolling shutter imaging device of a camera in which data containing the VLC transmissions data is within and outside a representation of a frame of the lighting device in captured images.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to modulated lighting using Visible Light Communication (VLC) transmissions containing encoded information or data, which can be obtained from rolling shutter images from, for example, the imager in a camera or in a mobile device while operating in an indoor setting having low to dark surrounding lighting, for example, in a movie theater or building without power, or an outdoor setting having dusk or night surrounding lighting.

Light based optical positioning services are implemented by systems and methods whereby the locations of mobile devices and their users are estimated based on codes and/or other information that the mobile devices obtain from processing of rolling shutter images of light outputs from lighting devices. Related location based services can provide information or other service capabilities based on the determined estimates of mobile device position.

The term "mobile device" includes all portable devices having a computational capability and a wireless communication capability (e.g., smartphones or other mobile telephones, tablets, wearable computers, portable media players, handheld game players, electronic tags, etc.). Mobile devices that operate with an optical positioning system, such as a VLC system, also include an appropriate optical sensor. Many types of mobile devices are equipped with cameras that may be utilized as the sensor for optical positioning. The optical positioning may be implemented using outdoor lighting devices, indoor lighting devices or a combination of indoor and outdoor lighting devices.

An "indoor" system is a system that provides positioning services and in some cases additional services over any relatively limited area. The area so served may be partly or entirely confined within a building, ship, mine, or other enclosed structure, but is not necessarily so confined. Hence, an "indoor" positioning system may operate partly or wholly in an area having a majority of enclosed spaces, e.g., over a campus, pedestrian mall, fairground, or the like, where such a service area may also include the interiors of one or more enclosures. In contrast to an "indoor" system, and "outdoor" system provides positional or informational services to an area that is an open, unenclosed area, i.e., a place or location outside the confines of a building or wholly enclosed structure, for example, a street, sidewalk or parking.

Moreover, the spaces or areas served by a single indoor or outdoor system may not all be contiguous (e.g., the system may distinguish between a number of spaces at somewhat separate locations and support navigation between as well as within those spaces). Also, although reference is made primarily to positioning services that discover and utilize information about mobile device locations in flat "areas" over which a two-dimensional coordinate system is appropriate (e.g., the floor space of a store), the technologies discussed below are applicable to systems discovering and utilizing information about mobile device locations in three-dimensional spaces.

The term "lighting device," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. In most examples, the lighting device(s) illuminate a service area to a level useful for a human in or passing through the space, e.g., regular illumination of a room or corridor in a building or of an outdoor space such as a street, sidewalk, parking lot or performance venue. However, a lighting device may provide light for use by automated equipment, such as sensors/monitors, robots, etc. that may occupy or observe the illuminated space, instead of or in addition to light provided for an organism. However, it is also possible that one or more lighting devices in or on a particular premises have other lighting purposes, such as signage for an entrance or to indicate an exit. The actual source of illumination light in or supplying the light for a lighting device may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other lighting device that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application. It is possible to modulate the light output of a source otherwise used for general, artificial illumination in the spaced served by a particular lighting device, so as to integrate the 'beacon' like ID code transmission capability with otherwise typical lighting related functions. Also, although much of the discussion below references visual light communication (VLC), the light based aspects of the positioning system/ service my transmit encoded information using other light wavelengths or frequencies outside the visible region of the light spectrum.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the lighting device may carry information, such as a code (e.g. to identify the luminaire or its location) or a downstream transmission of communication signaling and/or user data. The light based data transmission may involve modulation or otherwise adjusting parameters (e.g. intensity, color characteristic or distribution) of the illumination light output from the device.

The present teachings regarding capture of data or information from lighting device outputs in low light settings are applicable to a variety of systems that support various types of data communication applications. By way of example, the description and drawings concentrate on applications for position or location estimation. Systems and methods are provided that support a positioning or location service for devices based on rolling shutter images taken in dark or low surrounding lighting in indoor or outdoor settings where modulated light is received from one or more light sources. The light based positioning or location service uses, for example, Visible Light Communication (VLC) information transmitted by each light source to determine the position of the device. An image sensor of a rolling shutter camera captures the one or more light sources, and is then able to detect the information transmitted by each of the light sources. The information from the light source can include an identification code that is used to identify the position of the light source. By capturing more than one light source on the device the accuracy of the device's position can be improved. The position information can then be used to provide relevant content information to the user. The light sources are each independent beacons or point light sources that transmit individual identification information through modulated light, for example, Visible Light Communication (VLC).

In some examples, each light source is given an identification code, corresponding to an associated database, which contains information that ties the light source to specific location data. The identification codes are broadcasted through, for example, visible light by modulating the LED light source. The modulation occurs at speeds that are undetectable by the human eye, yet appropriate to be received by a camera equipped mobile device. The mobile device receives the identification information, and uses it to lookup its indoor or outdoor position in the form of location data. Since the identification information is transmitted through visible light, which is highly directional, the mobile device is known to be within the line of sight of the LED light source. Since the indoor or outdoor position of the light source is known, for example, from building floor plans and lighting plans, the corresponding position of the mobile device can be determined. Processing information about a number of lighting devices visible to the mobile device camera may enable trilateration or the like to provide a more precise estimation of the mobile device position.

Reference now is made in detail to the examples illustrated in the accompanying drawings and discussed below. FIG. 1 illustrates a system 100 that utilizes a lighting device 102, for example, in location determination of a mobile device 104 receiving light from a light source 112. The light source 112 can be any lighting source used for general purpose, spot illumination or backlighting suitable for modulated operation, although for purposes of further discussion, it is assumed that source 112 is a controllable light emitting diode (LED) type source. The LED light source 112 can come in several form factors but is not limited to: Edison screw in, tube style, large and small object backlighting, street lights, or accent lighting spots and strips. For the purposes of this disclosure, we consider any form of LED lighting as a potential source capable of transmitting information. The lighting device 102 includes logic and/or processing circuitry 114 to drive and control operations of a light source 112 and control operations of other elements of the lighting device 102. The logic and/or processing circuitry 114 may include elements such as a processor, a modulator to supply modulated power to the light source 112, and a memory as a storage device for programming and data.

The processor and/or modulator of the logic and/or processing circuitry 114 may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), waveform duration modulation, pulse position modulation (PPM), ternary Manchester encoding (TME) modulation, and digital pulse recognition (DPR) modulation. Other modulation schemes may implement a combination of two or more of these modulation techniques. Some of these modulation techniques may be combined with DC offset, e.g., so that the modulated source need not be turned completely off during modulation.

The lighting device 102 in our examples utilize wireless links for communication, although other communication media and technologies may be adapted to carry communications discussed herein to and/or from the modulatable lighting device 102. Hence, the lighting device 102 of FIG. 1 includes a radio frequency (RF) wireless transceiver (XCVR) 118 coupled to the logic and/or processing circuitry 114. The transceiver 118 in turn is coupled to an RF transmit/receive antenna 116 that may facilitate communication over wireless RF signals to and/or from other similarly equipped proximal devices, such as other lighting devices 102, mobile devices 104, wireless routers or relays, wireless enabled computing devices generally, RF equipped items such as appliances, tools, entertainment devices, RF tags, RF enabled network access points, multi-radio devices, and the like. The RF communication capability offered by transceiver 118 and the antenna 116 supports the various data communications of the lighting device 102 discussed herein.

The lighting device 102 of FIG. 1 may further include one or more sensors 120 for detecting aspects of the environment, including electromagnetic emissions from nearby computing devices of others of the lighting device 102. As another class of examples, the sensors 120 may include one or more feedback sensors for detecting operational parameters of the device 102, such as temperature and/or intensity or color characteristics of the light outputs of the light source 112.

Light output from, for example, the LED light source 112 is modulated, and is part of the visible electromagnetic wireless spectrum. LEDs are considered digital devices which can be rapidly switched on and off, to send signals above the rate which the human eye can see. This allows LEDs to be exploited to send digital data through the visible light itself. By modulating the LEDs, turning them on and off rapidly, one can send digital information that is unperceivable to the human eye, but is perceivable by applicable sensors, including but not limited to image sensors and other types of photosensors. Similar modulation may be between a minimum ON state and one or more higher ON states of the LEDs.

In FIG. 1, a camera 106, for example, can take a picture of the light source 112 of the light device 102 and such captured image will be processed by software and/or hardware processing elements of the mobile device 104. In an example, the rolling shutter mechanism of a complementary metal-oxide semiconductor (CMOS) image sensor may be used to capture the image. When a CMOS image sensor with a rolling shutter takes an image, it does not expose the entire image simultaneously such as would occur with global shutter circuitry used typically with CCD sensors. Instead, the rolling shutter partially exposes different portions of the frame at different points in time to sequentially scan an image from one side of the image sensor to the other, line by line. Typically, this causes various unwanted effects such as skew, wobble, and partial exposure. In the presence of an LED light driven by a pulse width modulated signal, images received from a CMOS sensor exhibit "residual banding" in the form of visible distortions. The image appears to have alternating dark/white stripes. The stripes are a direct result of the rolling shutter mechanism, and their width is proportional to the frequency of the pulse width modulated (PWM) signal. Higher frequencies correspond to narrower stripes, and lower frequencies result in wider stripes. Practical frequency ranges for use with this technique are between 60 Hz and 5000 Hz. This technique allows one to exploit the rolling shutter mechanism to recover digital data from an optically encoded signal or code word.

Figure 2A:
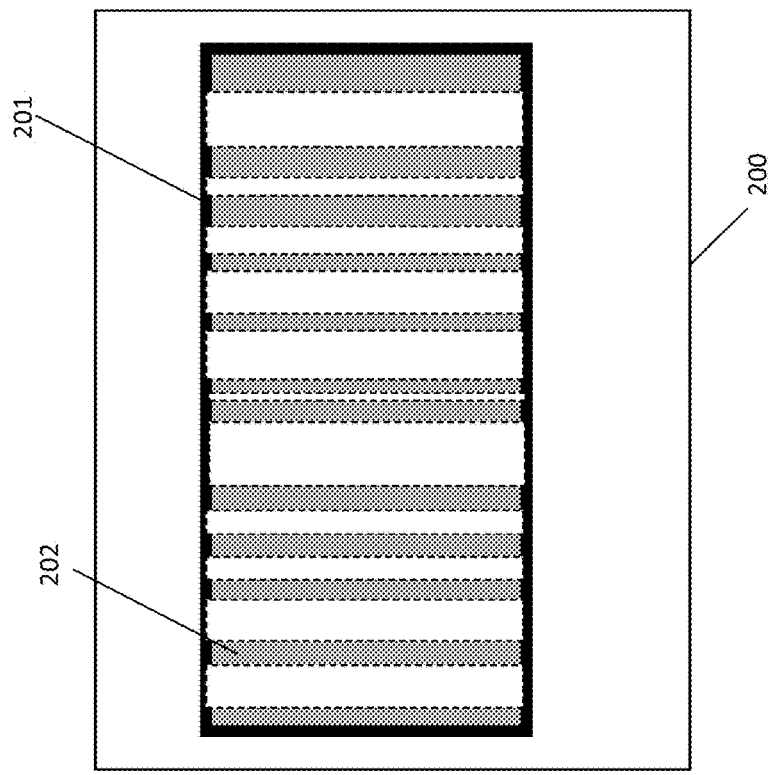

FIG. 2A illustrates a captured image 200 obtained from a rolling shutter-type image sensor in which the modulated light output is within a representation of a frame of the lighting device. FIG. 2A is an example in which a frame or outer perimeter of a lighting device 112 is large enough to include a complete representation of a modulated code word carried by the modulated light from the lighting device 112. The image sensor provides the modulated visible light output 202 to a processor of the mobile device for decoding.

In FIG. 2A, the rolling shutter-type image sensor is configured to accommodate a modulation using an application running on the mobile device, for example, LUMICAST VLC signals to transport data (e.g., device identifier codes or maintenance codes) on the visible light output from the lighting device. One of ordinary skill in the art will recognize that other modulation techniques similar to LUMICAST may also be used. The corresponding modulation application running on the mobile device is capable of analyzing the information on the camera image sensor to determine whether light output from the lighting device appears in the captured image and exhibits data of a size equal to a perimeter or frame of the lighting device and is of sufficient size in the image to enable capture of the complete code, and therefor enable decoding of the VLC transmission from the lighting device.

FIG. 2A provides an example of when the size of the modulated visible light output 202 within the captured image 200 is equal to a perimeter or frame of the lighting device 201; and the portion of captured image 200 representing the VLC transmission within that frame in the image includes data or a code word of a predetermined size for detection and decoding. Thus, the VLC data can be processed to determine, for example, location information, text information about items of interest or services available in the venue, maintenance codes or other communication applications.

FIG. 2B illustrates an example of a captured rolling shutter image 204 in which the VLC modulated light output 205 cannot be captured within the representation of a frame of the lighting device 206 within the image, i.e., the captured modulated visible light output 205 within the captured image 204 does not include the complete data or code word of a predetermined size for detection and decoding. Therefore, a portion of the VLC information will be loss. As discussed in more detail below, when a situation like FIG. 2B occurs, an adjustment is needed to enable capture of a representation of the modulated visible light (even beyond the fixture frame in the image) to at least the predetermined size to enable decoding of the complete data or code word.

Although camera 106 and mobile device 104 are depicted as separate elements in FIG. 1, this is only for simplicity and it is well known that various mobile devices include or otherwise incorporate a camera or image sensor. Thus, in an alternate example (e.g., FIGS. 3 and 4), a mobile device may utilize an included or otherwise incorporated camera or other image sensor to capture a image including a light source 112. Furthermore, although mobile device 104 is depicted as a mobile or smart phone, this is also only for simplicity. The term "mobile device" is intended to incorporate any device capable of being moved through a space, such as a drone, a wearable device, a tablet, a notebook/laptop computer or a desktop computer (e.g., a desktop computer positioned on a cart or otherwise configured to be moved). In addition, while various examples herein refer to a "user", this is also only for simplicity and the term "user" is intended to include both human and non-human actors (e.g., animal, robot, cyborg) as well as other forms of process controlling automata (e.g., processor controlling a self-controlling drone based on predetermined instructions).

Mobile device 104 can include a processor, module, memory, and sensor in order to capture and analyze light and data received from light sources. The mobile device can analyze the successive image frames captured by the sensor by using the module. The module can be logic implemented in any combination of hardware and software. The logic can be stored in memory and run by processor to modify the successive images and analyze the successive images to determine information encoded in the light of one or more light sources. The module can be built into the mobile device to provide the capabilities or it can be downloaded and installed. The module can be an application that runs on the mobile device when selected by a user. The module can also be used to receive content and other information related to the position of the mobile device and to provide this content to other modules or to the mobile device.

The reception of optically transmitted information is particularly interesting when used, for example, as an indoor or outdoor positioning system or to provide information to a user such as details regarding a nearby landmark or attraction or maintenance codes related to the lighting device. In a light based positioning system, the physical locations of light sources can be used to approximate the relative position of a mobile device 104 within a line of sight. On the mobile side, in addition to a receiving module, the mobile device 104 can use information to determine position of the mobile device. The mobile device can access a data source containing information about where the lights are physically located to determine position. This data source can be stored locally, or in the case where the mobile device 104 has a network connection 108, the data source could be stored on an external server 110.

Figure 3:
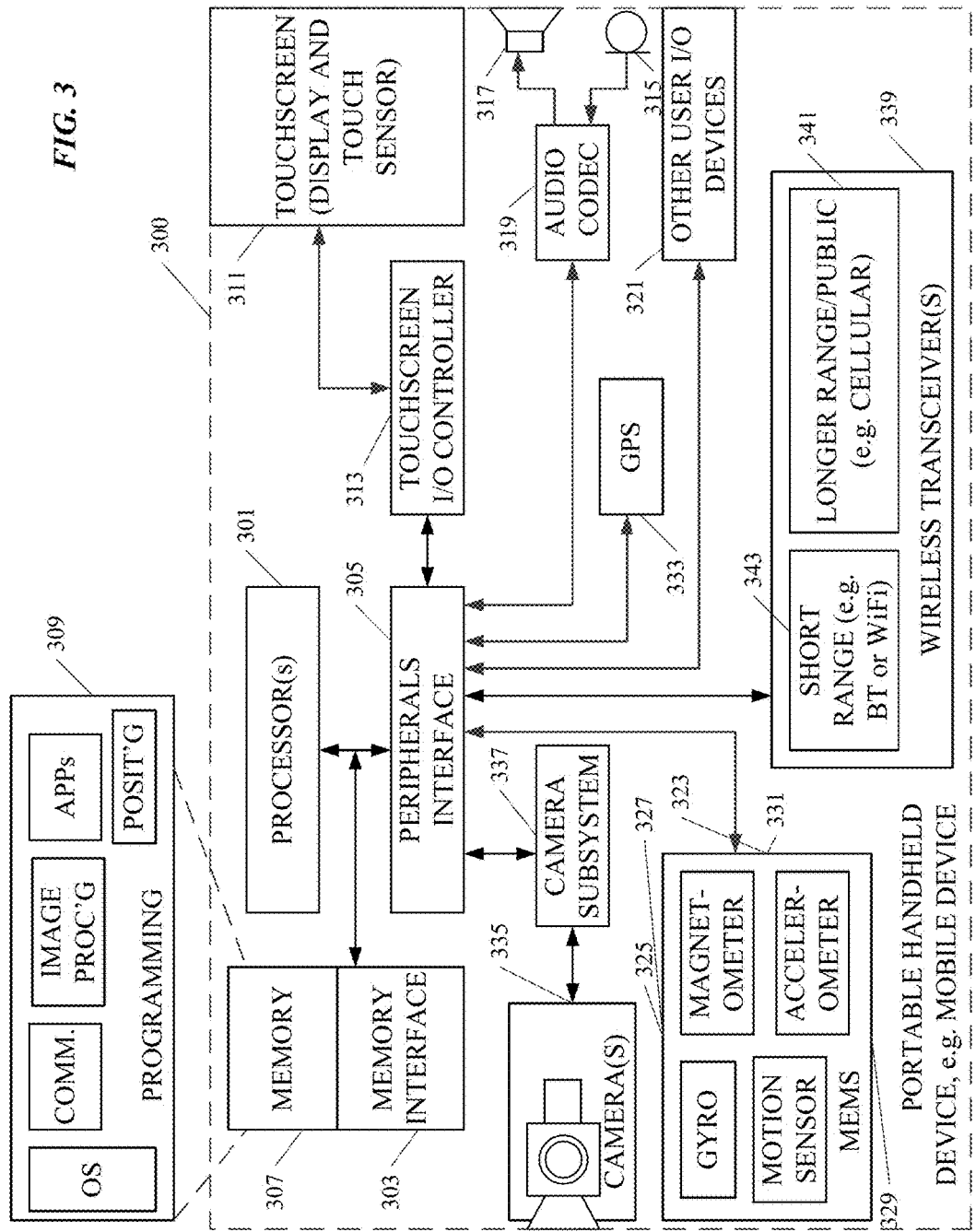
FIG. 3 is a simplified functional block diagram of a mobile device, by way of an example of a portable handheld device.

As shown by the above discussion, functions relating to the process of facilitating the reception of VLC information may be implemented on a portable handheld device, which at a high level, includes components such as a camera, a processor coupled to the camera, to control camera operation and to receive image data from the camera, a memory coupled to be accessible to the processor, and programming in the memory for execution by the processor. The portable handheld device may be any of a variety of modern devices, such as a handheld digital music player, a portable video game or handheld video game controller, etc. In most examples discussed herein, the portable handheld device is a mobile device, such as a smartphone, a wearable smart device (e.g. watch or glasses), a tablet computer, a device that can be attached to a movable object or the like. Those skilled in such hi-tech portable handheld devices will likely be familiar with the overall structure, programming and operation of the various types of such devices. For completeness, however, it may be helpful to summarize relevant aspects of a mobile device as just one example of a suitable portable handheld device. For that purpose, FIG. 3 provides a functional block diagram illustration of a mobile device 300, which may serve as the device 104 in the system of FIG. 1.

In the example, the mobile device 300 includes one or more processors 301, such as a microprocessor or the like serving as the central processing unit (CPU) or host processor of the mobile device 300. Other examples of processors that may be included in such a device include math co-processors, image processors, application processors (APs) and one or more baseband processors (BPs). The various included processors may be implemented as separate circuit components or can be integrated in one or more integrated circuits, e.g. on one or more chips. For ease of further discussion, we will refer to a single processor 301, although as outlined, such a processor or processor system of the mobile device 300 may include circuitry of multiple processing devices.

In the example, the mobile device 300 also includes memory interface 303 and peripherals interface 305, connected to the processor 301 for internal access and/or data exchange within the device 300. These interfaces 303, 305 also are interconnected to each other for internal access and/or data exchange within the device 300. Interconnections can use any convenient data communication technology, e.g. signal lines or one or more data and/or control buses (not separately shown) of suitable types.

In the example, the memory interface 303 provides the processor 301 and peripherals coupled to the peripherals interface 305 storage and/or retrieval access to memory 307. Although shown as a single hardware circuit for convenience, the memory 307 may include one, two or more types of memory devices, such as high-speed random access memory (RAM) and/or non-volatile memory, such as read only memory (ROM), flash memory, micro magnetic disk storage devices, etc. As discussed more later, memory 307 stores programming 309 for execution by the processor 301 as well as data to be saved and/or data to be processed by the processor 301 during execution of instructions included in the programming 309. New programming can be saved to the memory 307 by the processor 301. Data can be retrieved from the memory 307 by the processor 301; and data can be saved to the memory 307 and in some cases retrieved from the memory 307, by peripherals coupled via the interface 305.

In the illustrated example of a mobile device architecture, sensors, various input output devices, and the like are coupled to and therefore controllable by the processor 301 via the peripherals interface 305. Individual peripheral devices may connect directly to the interface or connect via an appropriate type of subsystem.

The mobile device 300 also includes appropriate input/output devices and interface elements. The example offers visual and audible inputs and outputs, as well as other types of inputs.

Although a display together with a keyboard/keypad and/or mouse/touchpad or the like may be used, the illustrated mobile device example 300 uses a touchscreen 311 to provide a combined display output to the device user and a tactile user input. The display may be a flat panel display, such as a liquid crystal display (LCD). For touch sensing, the user inputs would include a touch/position sensor, for example, in the form of transparent capacitive electrodes in or overlaid on an appropriate layer of the display panel. At a high level, a touchscreen displays information to a user and can detect occurrence and location of a touch on the area of the display. The touch may be an actual touch of the display device with a finger, stylus or other object; although at least some touchscreens can also sense when the object is in close proximity to the screen. Use of a touchscreen 311 as part of the user interface of the mobile device 300 enables a user of that device 300 to interact directly with the information presented on the display.

A touchscreen input/output (I/O) controller 313 is coupled between the peripherals interface 305 and the touchscreen 311. The touchscreen I/O controller 313 processes data received via the peripherals interface 305 and produces drive similar for the display component of the touchscreen 311 to cause that display to output visual information, such as images, animations and/or video. The touchscreen I/O controller 313 also includes the circuitry to drive the touch sensing elements of the touchscreen 311 and processing the touch sensing signals from those elements of the touchscreen 311. For example, the circuitry of touchscreen I/O controller 313 may apply appropriate voltage across capacitive sensing electrodes and process sensing signals from those electrodes to detect occurrence and position of each touch of the touchscreen 311. The touchscreen I/O controller 313 provides touch position information to the processor 301 via the peripherals interface 305, and the processor 301 can correlate that information to the information currently displayed via the display 311, to determine the nature of user input via the touchscreen.

As noted, the mobile device 300 in our example also offers audio inputs and/or outputs. The audio elements of the device 300 support audible communication functions for the user as well as providing additional user input/output functions. Hence, in the illustrated example, the mobile device 300 also includes a microphone 315, configured to detect audio input activity, as well as an audio output component such as one or more speakers 317 configured to provide audible information output to the user. Although other interfaces subsystems may be used, the example utilizes an audio coder/decoder (CODEC), as shown at 319, to interface audio to/from the digital media of the peripherals interface 305. The CODEC 319 converts an audio responsive analog signal from the microphone 315 to a digital format and supplies the digital audio to other element(s) of the device 300, via the peripherals interface 305. The CODEC 319 also receives digitized audio via the peripherals interface 305 and converts the digitized audio to an analog signal which the CODEC 319 outputs to drive the speaker 317. Although not shown, one or more amplifiers may be included in the audio system with the CODEC to amplify the analog signal from the microphone 315 or the analog signal from the CODEC 319 that drives the speaker 317.

Other user input/output (I/O) devices 321 can be coupled to the peripherals interface 305 directly or via an appropriate additional subsystem (not shown). Such other user input/output (I/O) devices 321 may include one or more buttons, rocker switches, thumb-wheel, infrared port, etc. as additional input elements. Examples of one or more buttons that may be present in a mobile device 300 include a home or escape button, an ON/OFF button, and an up/down button for volume control of the microphone 315 and/or speaker 317. Examples of output elements include various light emitters or tactile feedback emitters (e.g. vibrational devices). If provided, functionality of any one or more of the buttons, light emitters or tactile feedback generators may be context sensitive and/or customizable by the user.

The mobile device 300 in the example also includes one or more Micro ElectroMagnetic System (MEMS) sensors shown collectively at 323. Such MEMS devices 323, for example, can perform compass and orientation detection functions and/or provide motion detection. In this example, the elements of the MEMS 323 coupled to the peripherals interface 305 directly or via an appropriate additional subsystem (not shown) include a gyroscope (GYRO) 325 and a magnetometer 327. The elements of the MEMS 323 may also include a motion detector 329 and/or an accelerometer 331, e.g. instead of or as a supplement to detection functions of the GYRO 325.

The mobile device 300 in the example also includes a global positioning system (GPS) receiver 333 coupled to the peripherals interface 305 directly or via an appropriate additional subsystem (not shown). In general, a GPS receiver 333 receives and processes signals from GPS satellites to obtain data about the positions of satellites in the GPS constellation as well as timing measurements for signals received from several (e.g. 3-5) of the satellites, which a processor (e.g. the host processor 301 or another internal or remote processor in communication therewith) can process to determine the geographic location of the device 300.

In the example, the mobile device 300 further includes one or more cameras 335 as well as camera subsystem 337 coupled to the peripherals interface 305. A smartphone or tablet type mobile station often includes a front facing camera and a rear or back facing camera. Some recent designs of mobile stations, however, have featured additional cameras. Although the camera 335 may use other image sensing technologies, current examples often use charged coupled device (CCD) or a complementary metal-oxide semiconductor (CMOS) optical sensor. At least some such cameras implement a rolling shutter image capture technique. The camera subsystem 337 controls the camera operations in response to instructions from the processor 301; and the camera subsystem 337 may provide digital signal formatting of images captured by the camera 335 for communication via the peripherals interface 305 to the processor or other elements of the device 300.

The processor 301 controls each camera 335 via the peripherals interface 305 and the camera subsystem 337 to perform various image or video capture functions, for example, to take pictures or video clips in response to user inputs. The processor 301 may also control a camera 335 via the peripherals interface 305 and the camera subsystem 337 to obtain data detectable in a captured image, such as data represented by a code in an image or in Visible Light Communication (VLC) detectable in an image. In the data capture case, the camera 335 and the camera subsystem 337 supply image data via the peripherals interface 305 to the processor 301, and the processor 301 processes the image data to extract or demodulate data from the captured image(s).

Voice and/or data communication functions are supported by one or more wireless communication transceivers 339. In the example, the mobile device includes a cellular or other mobile transceiver 341 for longer range communications via a public mobile wireless communication network. A typical modern device, for example, might include a 4G LTE (long term evolution) type transceiver. Although not shown for convenience, the mobile device 300 may include additional digital or analog transceivers for alternative wireless communications via a wide area wireless mobile communication network.

Many modern mobile devices also support wireless local communications over one or more standardized wireless protocols. Hence, in the example, the wireless communication transceivers 339 also include at least one shorter range wireless transceiver 343. Typical examples of the wireless transceiver 343 include various iterations of WiFi (IEEE 802.11) transceivers and Bluetooth (IEEE 802.15) transceivers, although other or additional types of shorter range transmitters and/or receivers may be included for local communication functions.

As noted earlier, the memory 307 stores programming 309 for execution by the processor 301 as well as data to be saved and/or data to be processed by the processor 301 during execution of instructions included in the programming 309. For example, the programming 309 may include an operating system (OS) and programming for typical functions such as communications (COMM.), image processing (IMAGE PROC'G) and positioning (POSIT'G). Examples of typical operating systems include iOS, Android, BlackBerry OS and Windows for Mobile. The OS also allows the processor 301 to execute various higher layer applications (APPs) that use the native operation functions such as communications, image processing and positioning.

Mobile device 300 may control camera 335 and camera subsystem 337 to capture an image and process, by processor 301 and based on instructions stored in memory 307 as part of programming 309, the captured image. Mobile device 300 may determine, based on the location of the lighting device, a relative location of mobile device 300. Once the relative location of the mobile device 300 is determined, mobile device 300, via touchscreen I/O controller 313, may depict an indication of that location on touchscreen 311 and/or present information about that location. Other location-related information, e.g. turn by run directions to a desired destination, may be presented via the touchscreen 311. In this way, a location for mobile device 300 may be determined and presented to a user of device 300.

As shown by the above discussion, functions relating to the process of utilizing a lighting device to facilitate mobile device location determination may be implemented on computers connected for data communication via the components of a packet data network, operating as a server as shown in FIG. 1. Although special purpose devices may be used, such devices also may be implemented using one or more hardware platforms intended to represent a general class of user's data processing device commonly used to run "client" programming and/or a general class of data processing device commonly used to run "server" programming. The user device may correspond to mobile device 335 of FIG. 3 whereas the server computer may be configured to implement various location determination related functions as discussed above.

As known in the data processing and communications arts, a general-purpose computing device, computer or computer system typically comprises a central processor or other processing device, internal data connection(s), various types of memory or storage media (RAM, ROM, EEPROM, cache memory, disk drives etc.) for code and data storage, and one or more network interfaces for communication purposes. The software functionalities involve programming, including executable code as well as associated stored data, e.g. files used for the mobile device location determination service/function(s). The software code is executable by the general-purpose computer that functions as the server and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for utilizing a uniquely identifiable lighting device to facilitate mobile device location determination, in essentially the manner performed in the implementations discussed and illustrated herein. Although those skilled in the art likely are familiar with the structure, programming and general operation of such computer systems, it may be helpful to consider some high-level examples.

Figure 4:
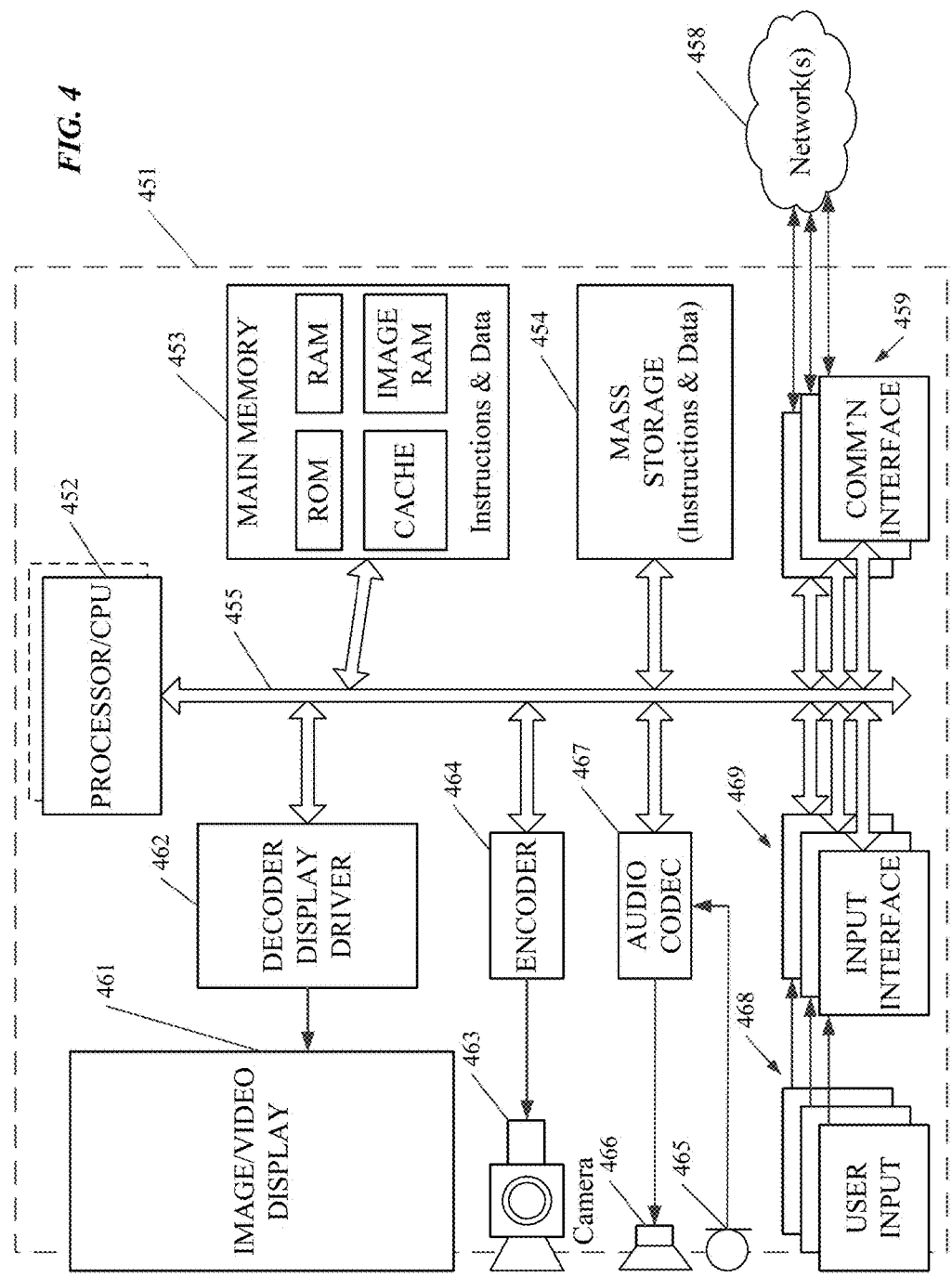
FIG. 4 is a simplified functional block diagram of a personal computer or other work station or terminal device.
Figure 5:
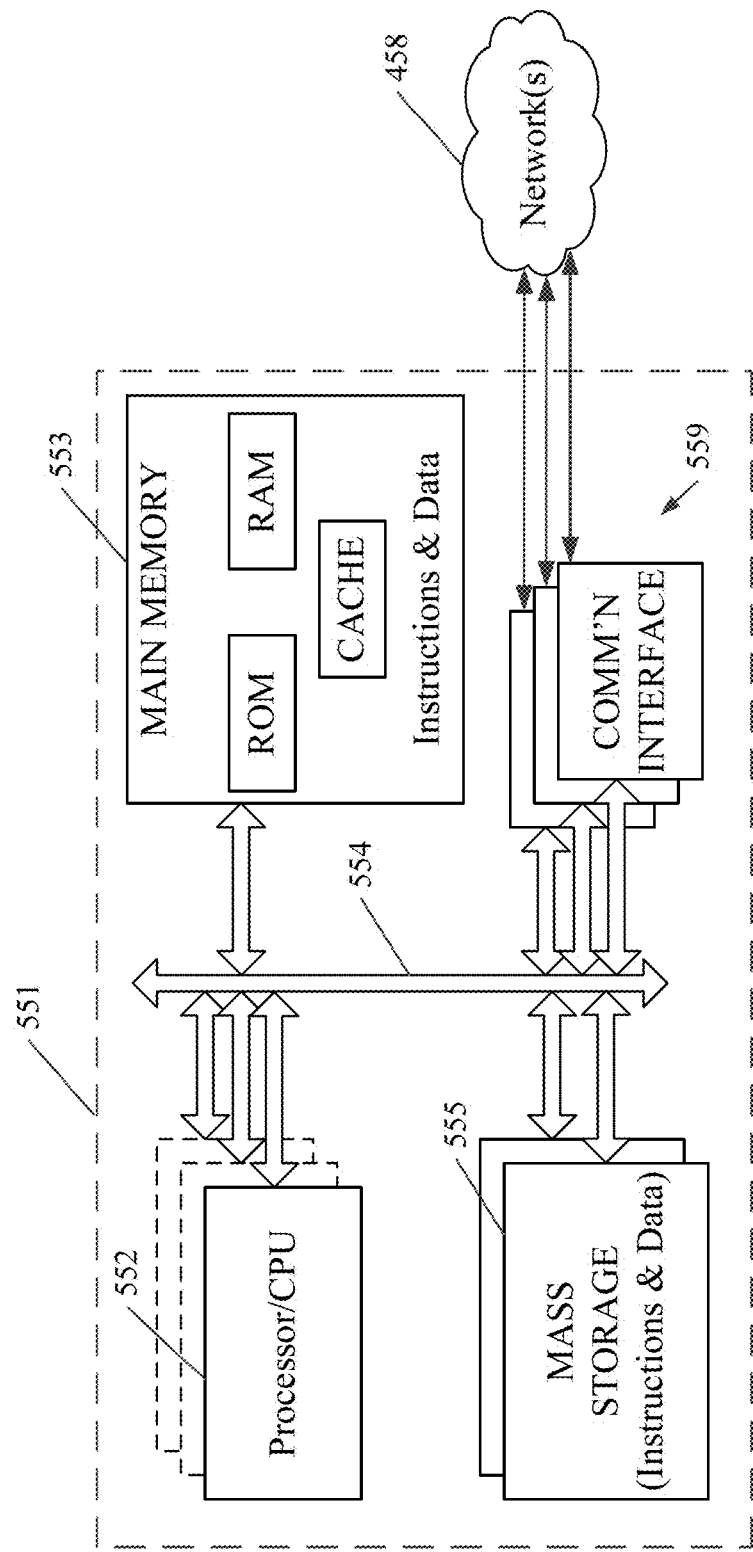
FIG. 5 is a simplified functional block diagram of a computer that may be configured as a host or server, for example, to function as the server in the system of FIG. 1.

FIGS. 4 and 5 provide functional block diagram illustrations of general purpose computer hardware platforms. FIG. 4 depicts a computer with user interface elements, as may be used to implement a client computer or other type of work station or terminal device, although the computer of FIG. 4 may also act as a host or server if appropriately programmed. FIG. 5 illustrates a network or host computer platform, as may typically be used to implement a server.

With reference to FIG. 4, a user device type computer system 451, which may serve as a user terminal, includes processor circuitry forming a central processing unit (CPU) 452. The circuitry implementing the CPU 452 may be based on any processor or microprocessor architecture such as a Reduced Instruction Set Computing (RISC) using an ARM architecture, as commonly used today in mobile devices and other portable electronic devices, or a microprocessor architecture more commonly used in computers such as an Instruction Set Architecture (ISA) or Complex Instruction Set Computing (CISC) architecture. The CPU 452 may use any other suitable architecture. Any such architecture may use one or more processing cores. The CPU 452 may contain a single processor/microprocessor, or it may contain a number of microprocessors for configuring the computer system 451 as a multi-processor system.

The computer system 451 also includes a main memory 453 that stores at least portions of instructions for execution by and data for processing by the CPU 452. The main memory 453 may include one or more of several different types of storage devices, such as read only memory (ROM), random access memory (RAM), cache and possibly an image memory (e.g. to enhance image/video processing). Although not separately shown, the memory 453 may include or be formed of other types of known memory/storage devices, such as PROM (programmable read only memory), EPROM (erasable programmable read only memory), FLASH-EPROM, or the like.

The system 451 also includes one or more mass storage devices 454. Although a storage device 454 could be implemented using any of the known types of disk drive or even tape drive, the trend is to utilize semiconductor memory technologies, particularly for portable or handheld system form factors. As noted, the main memory 453 stores at least portions of instructions for execution and data for processing by the CPU 452. The mass storage device 454 provides longer term non-volatile storage for larger volumes of program instructions and data. For a personal computer, or other similar device example, the mass storage device 454 may store the operating system and application software as well as content data, e.g. for uploading to main memory and execution or processing by the CPU 452. Examples of content data include messages and documents, and various multimedia content files (e.g. images, audio, video, text and combinations thereof), Instructions and data can also be moved from the CPU 452 and/or memory 453 for storage in device 454.

The processor/CPU 452 is coupled to have access to the various instructions and data contained in the main memory 453 and mass storage device 454. Although other interconnection arrangements may be used, the example utilizes an interconnect bus 455. The interconnect bus 455 also provides internal communications with other elements of the computer system 451.

The system 451 also includes one or more input/output interfaces for communications, shown by way of example as several interfaces 459 for data communications via a network 458. The network 458 may be or communicate with the network 108 of FIG. 1. Although narrowband modems are also available, increasingly each communication interface 459 provides a broadband data communication capability over wired, fiber or wireless link. Examples include wireless (e.g. WiFi) and cable connection Ethernet cards (wired or fiber optic), mobile broadband 'aircards,' and Bluetooth access devices. Infrared and visual light type wireless communications are also contemplated. Outside the system 451, the interfaces provide communications over corresponding types of links to the network 458. In the example, within the system 451, the interfaces communicate data to and from other elements of the system via the interconnect bus 455.

For operation as a user terminal device, the computer system 451 further includes appropriate input/output devices and interface elements. The example offers visual and audible inputs and outputs, as well as other types of inputs. Although not shown, the system may also support other types of output, e.g. via a printer. The input and output hardware devices are shown as elements of the device or system 451, for example, as may be the case if the computer system 451 is implemented as a portable computer device (e.g. laptop, notebook or ultrabook), tablet, smartphone or other portable device. In other implementations, however, some or all of the input and output hardware devices may be separate devices connected to the other system elements via wired or wireless links and appropriate interface hardware.

For visual output, the computer system 451 includes an image or video display 461 and an associated decoder and display driver circuit 462. The display 461 may be a projector or the like but typically is a flat panel display, such as a liquid crystal display (LCD). The decoder function decodes video or other image content from a standard format, and the driver supplies signals to drive the display 461 to output the visual information. The CPU 452 controls image presentation on the display 461 via the display driver 462, to present visible outputs from the device 451 to a user, such as application displays and displays of various content items (e.g. still images, videos, messages, documents, and the like).

In the example, the computer system 451 also includes a camera 463 as a visible light image sensor. Various types of cameras may be used. The camera 463 typically can provide still images and/or a video stream, in the example to an encoder 464. The encoder 464 interfaces the camera to the interconnect bus 455. For example, the encoder 464 converts the image/video signal from the camera 463 to a standard digital format suitable for storage and/or other processing and supplies that digital image/video content to other element(s) of the system 451, via the bus 455. Connections to allow the CPU 452 to control operations of the camera 463 are omitted for simplicity.

In the example, the computer system 451 includes a microphone 465, configured to detect audio input activity, as well as an audio output component such as one or more speakers 466 configured to provide audible information output to the user. Although other interfaces may be used, the example utilizes an audio coder/decoder (CODEC), as shown at 467, to interface audio to/from the digital media of the interconnect bus 455. The CODEC 467 converts an audio responsive analog signal from the microphone 465 to a digital format and supplies the digital audio to other element(s) of the system 451, via the bus 455. The CODEC 467 also receives digitized audio via the bus 455 and converts the digitized audio to an analog signal which the CODEC 467 outputs to drive the speaker 466. Although not shown, one or more amplifiers may be included to amplify the analog signal from the microphone 465 or the analog signal from the CODEC 467 that drives the speaker 466.

Depending on the form factor and intended type of usage/applications for the computer system 451, the system 451 will include one or more of various types of additional user input elements, shown collectively at 468. Each such element 468 will have an associated interface 469 to provide responsive data to other system elements via bus 455. Examples of suitable user inputs 468 include a keyboard or keypad, a cursor control (e.g. a mouse, touchpad, trackball, cursor direction keys etc.).

Another user interface option provides a touchscreen display feature. At a high level, a touchscreen display is a device that displays information to a user and can detect occurrence and location of a touch on the area of the display. The touch may be an actual touch of the display device with a finger, stylus or other object; although at least some touchscreens can also sense when the object is in close proximity to the screen. Use of a touchscreen display as part of the user interface enables a user to interact directly with the information presented on the display. The display may be essentially the same as discussed above relative to element 461 as shown in the drawing. For touch sensing, however, the user inputs 468 and interfaces 469 would include a touch/position sensor and associated sense signal processing circuit. The touch/position sensor is relatively transparent, so that the user may view the information presented on the display 461. The sense signal processing circuit receives sensing signals from elements of the touch/position sensor and detects occurrence and position of each touch of the screen formed by the display and sensor. The sense circuit provides touch position information to the CPU 452 via the bus 455, and the CPU 452 can correlate that information to the information currently displayed via the display 461, to determine the nature of user input via the touchscreen.

A mobile device type user terminal may include elements similar to those of a laptop or desktop computer, but will typically use smaller components that also require less power, to facilitate implementation in a portable form factor. Some portable devices include similar but smaller input and output elements. Tablets and smartphones, for example, utilize touch sensitive display screens, instead of separate keyboard and cursor control elements.

Each computer system 451 runs a variety of applications programs and stores data, enabling one or more interactions via the user interface, provided through elements, and/or over the network 458 to implement the desired user device processing for the device location determination service based on a uniquely identifiable lighting device described herein or the processing of captured images for such device location determination services. The user computer system/device 451, for example, runs a general purpose browser application and/or a separate device location determination application program.

Turning now to consider a server or host computer, FIG. 5 is a functional block diagram of a general-purpose computer system 551, which may perform the functions of the server 110 in FIG. 1 or the like.

The example 551 will generally be described as an implementation of a server computer, e.g. as might be configured as a blade device in a server farm. Alternatively, the computer system may comprise a mainframe or other type of host computer system capable of web-based communications, media content distribution, or the like via the network 458. Although shown as the same network as served the user computer system 451, the computer system 551 may connect to a different network.

The computer system 551 in the example includes a central processing unit (CPU) 552, a main memory 553, mass storage 555 and an interconnect bus 554. These elements may be similar to elements of the computer system 451 or may use higher capacity hardware. The circuitry forming the CPU 552 may contain a single microprocessor, or may contain a number of microprocessors for configuring the computer system 552 as a multi-processor system, or may use a higher speed processing architecture. The main memory 553 in the example includes ROM, RAM and cache memory; although other memory devices may be added or substituted. Although semiconductor memory may be used in the mass storage devices 555, magnetic type devices (tape or disk) and optical disk devices typically provide higher volume storage in host computer or server applications. In operation, the main memory 553 stores at least portions of instructions and data for execution by the CPU 552, although instructions and data are moved between memory and storage and CPU via the interconnect bus in a manner similar to transfers discussed above relative to the system 451 of FIG. 4.

The system 551 also includes one or more input/output interfaces for communications, shown by way of example as interfaces 559 for data communications via the network 458. Each interface 559 may be a high-speed modem, an Ethernet (optical, cable or wireless) card or any other appropriate data communications device. To provide the device location determination service to a large number of users' client devices, the interface(s) 559 preferably provide(s) a relatively high-speed link to the network 458. The physical communication link(s) may be optical, wired, or wireless (e.g., via satellite or cellular network).

Although not shown, the system 551 may further include appropriate input/output ports for interconnection with a local display and a keyboard or the like serving as a local user interface for configuration, programming or troubleshooting purposes. Alternatively, the server operations personnel may interact with the system 551 for control and programming of the system from remote terminal devices via the Internet or some other link via network 458.

The computer system 551 runs a variety of applications programs and stores the necessary information for support of the device location determination service described herein. One or more such applications enable the delivery of web pages and/or the generation of e-mail messages. Those skilled in the art will recognize that the computer system 551 may run other programs and/or host other web-based or e-mail based services. As such, the system 551 need not sit idle while waiting for device location determination service related functions. In some applications, the same equipment may offer other services.

The example (FIG. 5) shows a single instance of a computer system 551. Of course, the server or host functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like 451, 551 generally are conventional in nature, and it is presumed that those skilled in the art are sufficiently familiar therewith to understand implementation of the present device location determination technique using suitable configuration and/or programming of such computer system(s) particularly as outlined above relative to 451 of FIG. 4 and 551 of FIG. 5.

Hence, aspects of the methods of capturing an image of VLC modulated data in identifying a lighting device to facilitate mobile device location estimation outlined above may be embodied in programming, e.g. in the form of software, firmware, or microcode executable by a user computer system or mobile device, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform that will be the server 110 of FIG. 1 and/or the computer platform of the user that will be the client device for the device location determination service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the process of utilizing a uniquely identifiable lighting device to facilitate mobile device location determination, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program. In terms of the experience when using a light based positioning system, the indoor or outdoor location reception and calculation can happen with little to no user input. The process operates as a background service, and reads from the receiving module without actually writing them to the display screen of the mobile device. This is analogous to the way WiFi positioning operates, signals are read in a background service without requiring user interaction. The results of the received information can be displayed in a number of ways, depending on the desired application. In the case of an indoor navigation application, the user would see an identifying marker overlaid on a map of the indoor space they are moving around in. In the case of content delivery, the user might see a mobile media, images, text, videos, or recorded audio, about the objects they are standing in front of. Software such as LUMICAST or other applications know in the art may be used for this process.

The above descriptions cover situations in which the image or data transmissions captured as images by the rolling shutter image sensor contain a complete frame of data or code word within a representation of the frame of the lighting device, as illustrated in FIG. 2A. However, as illustrated in FIG. 2B, when the captured image includes a representation of the VLC transmissions from the rolling shutter that is too small or a distance too far away from the image sensor to represent a full frame of data or a complete code word, and does not fit within the representative frame of the lighting device, then the full VLC transmission cannot be detected, and a portion of the information will be loss. To remedy a situation in which the complete frame of data or code word of the VLC transmission of a lighting device cannot be detected, hardware features of the camera of the mobile device can be adjusted.

Figure 6B:
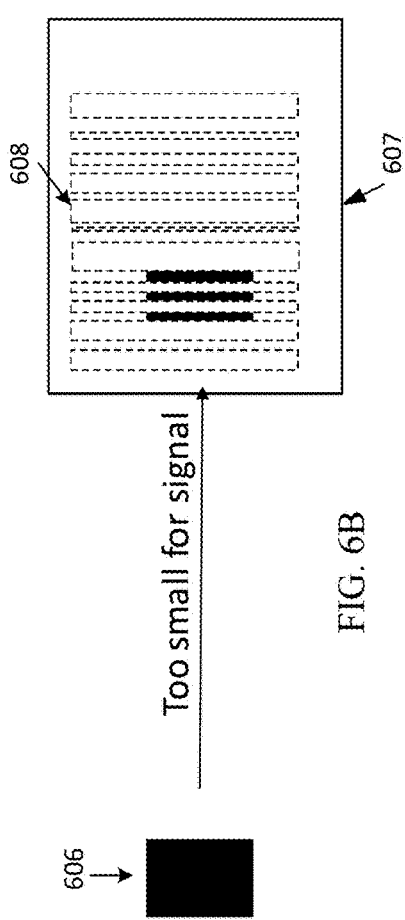
FIGS. 6A, 6B, and 6C illustrate examples of capturing a rolling shutter image of VLC encoded light and determining when the captured image data is ready for decoding.
Figure 6C:
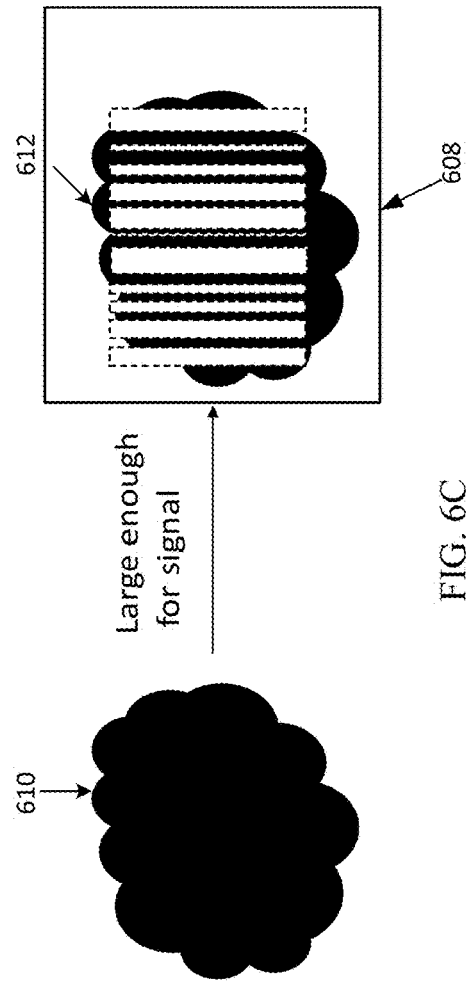
Figure 6A:
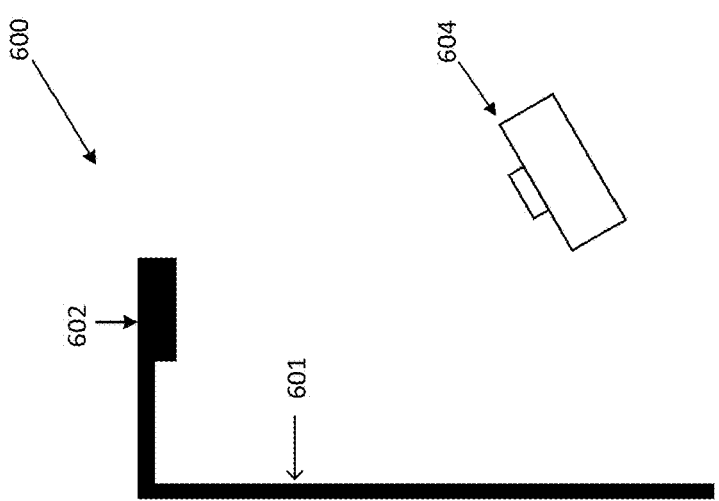

FIG. 6A illustrates an example 600 in which camera 604, including a rolling shutter-type image sensor, obtains an image of a lighting device 602, for example, a streetlight at dusk or nighttime, attached to a light pole 601. Lighting device 602 is, for example, a Visible Light Communication (VLC) enabled lighting device in an indoor or outdoor setting having low to night/dark surrounding lighting. The camera 604 may be included within any handheld mobile device such as a smart phone, laptop computer or tablet. The rolling shutter-type image sensor of the camera 604 is configured to accommodate a modulation application running on the camera or mobile device including the camera such as LUMICAST standard, which analyzes information from the image sensor to decode VLC transmissions captured as images from the lighting device 602. With the rolling shutter image, a line-by-line processing of the image progresses from, for example, top to bottom across the image on the image sensor such that an image appears similar to alternating black/white stripes or a bar code, as illustrated, for example in FIG. 2A. The bars or stripes in the image correspond to the pulse widths modulation signals of the VLC transmission from lighting device 602. Each combination of a white stripe and a following black stripe represent a symbol, and the combined widths of those stripes correspond to the duration of symbol periods which can be used to represent, for example, a unique fixture ID, frame of data, or code word of the lighting device 602 and/or light pole 601.

FIG. 6B illustrates an image 606 of lighting device 602 contained within an image captured by the image sensor of camera 604. The image 606 represents an example of when light output including modulated data from the lighting device 602 is too small or a distance too far away from the camera 604 to represent a full frame of data or a complete code word. More specifically, the image 606 is too small to completely include the coded information. As a result, the VLC transmission data obtained in the image 607 would be too small to represent a predetermined number of bars 608 within the captured image 607 to decode the VLC transmission from the lighting device 602. The number of bars needed and VLC decoding of the transmissions are determined using, for example, an application such as VLC LUMICAST standard. As depicted in FIG. 6B, the captured image 607 contains 3 bars 608 of information; however, when using a modulation application such as LUMICAST, a representative image having a frame of data size of 10 bars of information would be needed to decode the modulated information. LUMICAST is used as an example of one application that can be used for decoding the VLC transmissions. One of ordinary skill in the art would recognize that other modulation techniques may be used to decode the VLC transmissions and may have a different threshold of bars of information needed for decoding the VLC transmissions from the image sensor.

To remedy the example of FIG. 6B in which the captured image data of the VLC transmission is too small (less than the size to decode a code word), it is necessary to enlarge representation of modulated light in the image of light from the lighting device that is captured by camera 604. Techniques to enlarge the image from the image sensor include, for example, adjusting elements of the camera so that the captured image is overexposed to cause blooming. The blooming, in effect, enlarges the camera detector area to increase exposure of the image sensor which then enlarges the captured image of the frame and modulated data from the lighting device. Other exemplary scattering techniques that may be used to enlarge the image of the VLC transmissions include, adjusting the focus of the camera 604 so that the image is defocused or blurred, or changing the ISO setting, the sensitivity of the image sensor.

As an example of capturing an image in an indoor setting having low to dark surrounding lighting, for example, in a movie theater or signage at a building's emergency exit, or an outdoor setting having a streetlight at dusk or nighttime surrounding lighting, the ISO setting would be increased to allow faster shutter speeds of the camera.

FIG. 6C illustrates an example in which the captured image 610 from camera 604 is enlarged by scattering, blooming or blurring such that the image representation 612 of the VLC transmissions from the lighting device 602 is of sufficient size in the image 608 to enable capture of the code and is a predetermined size for detection and decoding using a modulation application.

Figure 7:
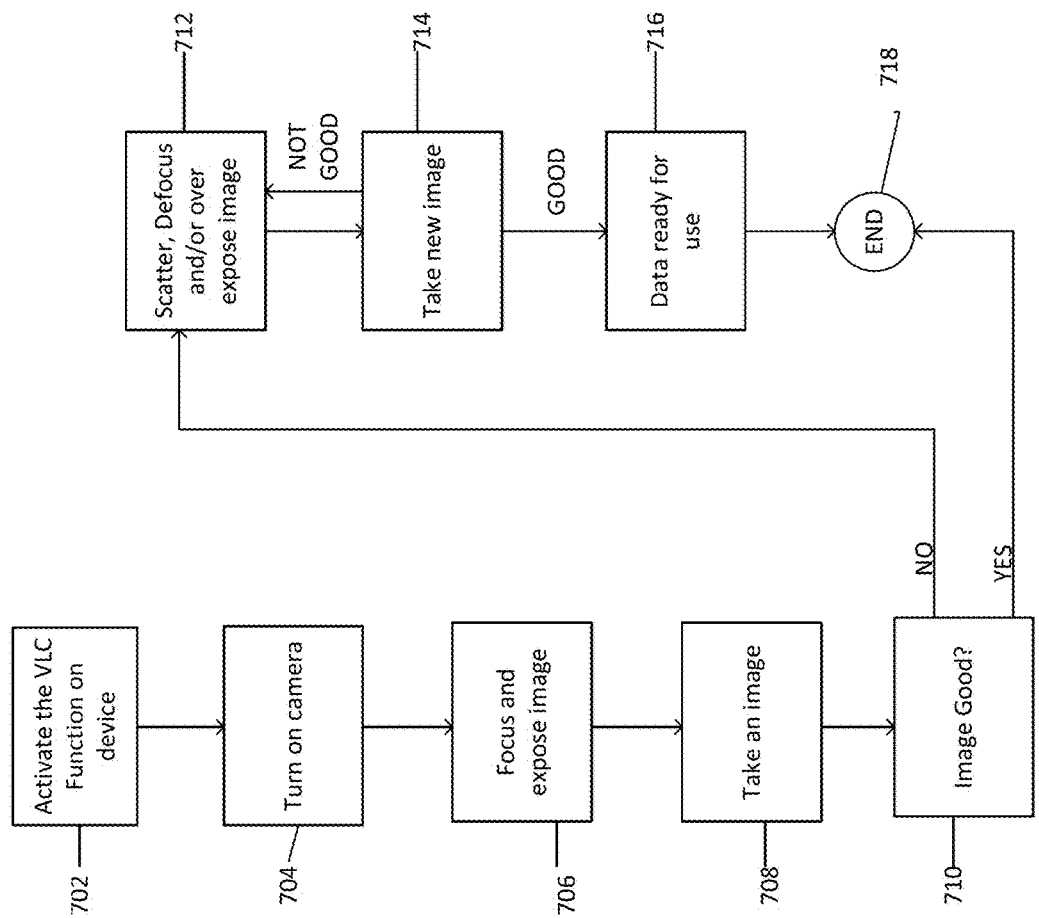
FIG. 7 is a flow chart illustrating a process for obtaining and analyzing a rolling shutter image of Visible Light Communication transmissions from a lighting device in the examples of FIGS. 6A, 6B and 6C.

FIG. 7 is a flow chart illustrating a process for obtaining and analyzing a rolling shutter image of Visible Light Communication (VLC) transmissions from a light source in the examples of FIGS. 6A, 6B and 6C.

In step 702, the lighting device 602 is a VLC enabled lighting device located in an indoor setting having low to dark surrounding lighting, for example, in a movie theater, or an outdoor setting having dusk or nighttime surrounding lighting. The VLC function of the lighting device 602 is activated when information data is modulated and output from the light source of the lighting device 602. In steps 704 and 706, the camera 604 is turned on, and a setting of the camera, for example, the lens or shutter, is adjusted to obtain an image 606 of the lighting device 602 on light pole 601.

In step 708, after the setting of, for example, the lens and shutter, are adjusted to be in focus, an image 606 of the lighting device is taken. In addition to the image of the lighting device 602 being taken, pertinent metadata contained in the image such as time, color, model, aperture value, brightness value, compass setting, location codes, accelerometer value, etc., of the camera may be recorded to aid in, for example, location analysis, maintenance, self-learning for future measurements and efficiency, or other communication application.

At step 710, a determination is made as to whether light output from the lighting device appears in the captured image and exhibits data of a size equal to a perimeter or frame of the lighting device and the VLC transmission is of sufficient size in the image to enable capture of the complete code, i.e., within a predetermined number of bars when using a modulation application for decoding. As discussed above with respect to FIGS. 2A, 2B, 6B, and 6C, if the size of the light output containing the VLC transmission is not equal to a perimeter or frame of the lighting device and does not represent a predetermined number of bars of the captured image from the image sensor, i.e., the representative image is too small to include the entire encoded data or expands outside the frame of the lighting device, then the representative image of the modulated data is not good for detection and decoding, and proceed to step 712.

In step 712, settings of the camera 604 are adjusted to cause an image of the light output including the VLC transmissions from the lighting device 602 to be scattered, defocused and/or overexposed. As a result of the adjustments to the camera 604, blooming or blurrying of the image will occur. Thus, in step 714, a new image is taken that is the blooming or blurrying VLC transmissions from the lighting device 602. The new captured image is analyzed to determine whether light output including the VLC transmissions is a size equal to a perimeter or frame of the lighting device and represents at least a predetermined number of bars of the captured image from the lighting device. If NOT GOOD (as illustrated in FIGS. 2B and 6B when not good for detection or decoding), then return to step 712 to further adjust the settings of the camera 604 to scatter, defocus and/or overexpose an image of the VLC transmissions from the lighting device 602. If YES, the data is equal to a perimeter or frame of the lighting device and represents at least a predetermined number of bars (based upon the modulation application being used for decoding) of the captured image from the lighting device (as illustrated in FIGS. 2A and 6C), then proceed to step 716.

In step 716, the captured image including the frame of data or code word of the VLC transmissions from the lighting device 602 is good, and the modulated data from the image is reading for analysis and use. In an example, the data can be used to perform a computation to estimate the location of the camera and/or mobile device or locate a lighting device needing maintenance. The process ends at step 718.

Figure 8A:
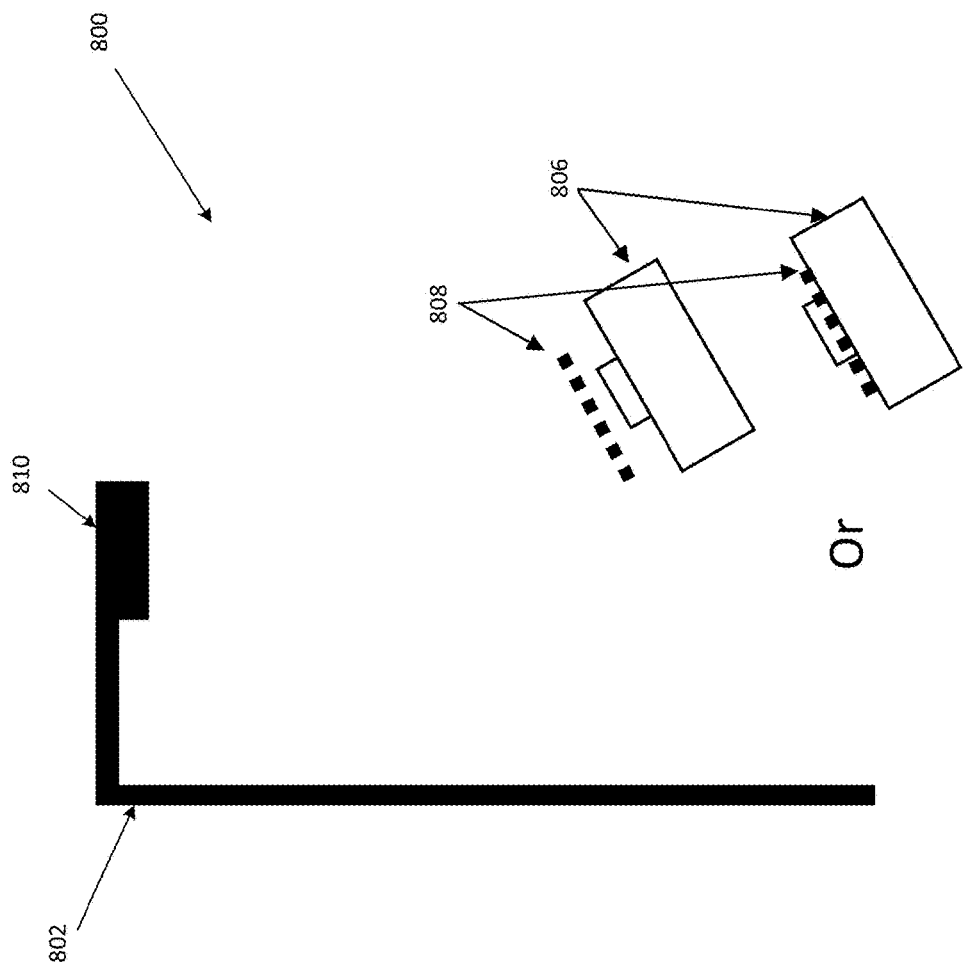
FIGS. 8A, 8B, and 8C illustrate examples of using optical elements or material to capture a rolling shutter image of VLC encoded light, and determining when a portion having the modulated visible light output within the captured image data is a predetermined size for decoding.
Figures 8B, 8C:
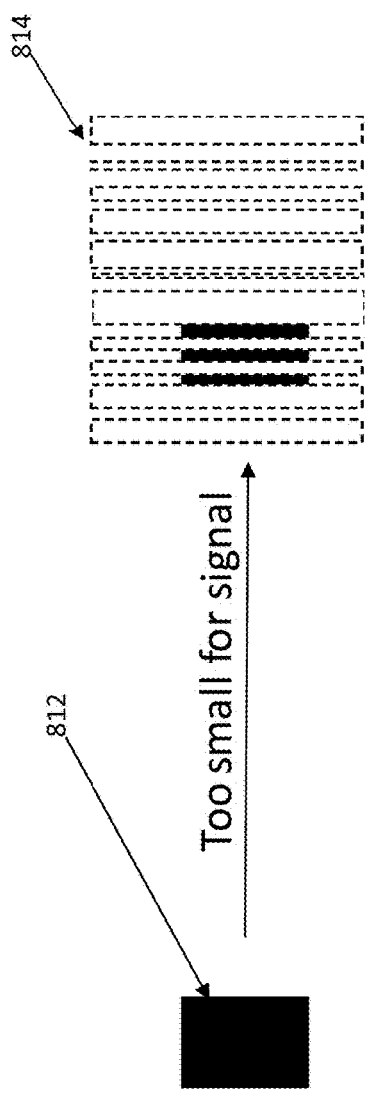

FIGS. 8A, 8B, and 8C illustrate examples of using optical elements or added materials to capture a rolling shutter image, and determining when the modulated VLC data within the captured image is a predetermined size for decoding and use. In particular, FIG. 8A illustrates examples of active techniques of adding optical hardware or materials to the camera to improve detection of VLC transmissions in a generally dark environment which may occur in an indoor setting such as a movie theater or at night or dusk light in an outdoor setting.

In example 800 of FIG. 8A, optical hardware or materials 808 are used for scattering optics of the camera 806. The optical hardware or materials 808 can be exterior to the camera located in front of the camera lens, or physically arranged inside the camera. Examples of the optical hardware or materials 808 that can be used include, but are not limited to, a diffuser, lenslets, liquid crystal or diffraction gratings. The optical hardware can be switchable or exchangeable so as not to interfere with normal operations of the mobile device or camera.

In FIG. 8B, camera 806 captures an image 812 of a lighting device 810 arranged, for example, on a pole 802. The image 812 is taken when, for example, camera 806 does not have added optical hardware or materials 808. As illustrated in FIG. 8B, the image 812 is too small to represent a full frame of data or a complete code word. As a result, the VLC transmission data obtained in the image 812 is too small to represent a predetermined number of bars that would be necessary for detection or decoding the VLC transmission from the lighting device 810. The number of bars needed for decoding within the captured image 814 is based upon a modulation application running on the mobile device, for example, LUMICAST, or the Acuity Brands ATRIUS Navigator for providing a "blue dot" mapping system or BYTELIGHT. As discussed above, the captured image 814 depicts 10 bars; however, the image 812 covers much less. As a result, the image 812 is too small to provide a full frame of data or complete code word of the VLC transmission for decoding and analysis.

FIG. 8C illustrates an example of the use of optical hardware or materials 808 to enlarge the representative image for decoding of the modulated VLC transmissions. Specifically, camera 806 includes optical hardware or material 808 to capture an image 816 of the VLC transmissions from lighting device 810. As illustrated, the rolling shutter image 816 captured by the image sensor of camera 806 having scattering optic hardware or materials represents a frame of data of a size equal to a perimeter or frame of the lighting device and the VLC transmission, for example, 10 bars, is a predetermined size 818 for detection and decoding. Accordingly, the frame of modulated data or code word included in the captured image 816 is a sufficient size for analysis by the user to provide information data for communication applications.

Figure 9:
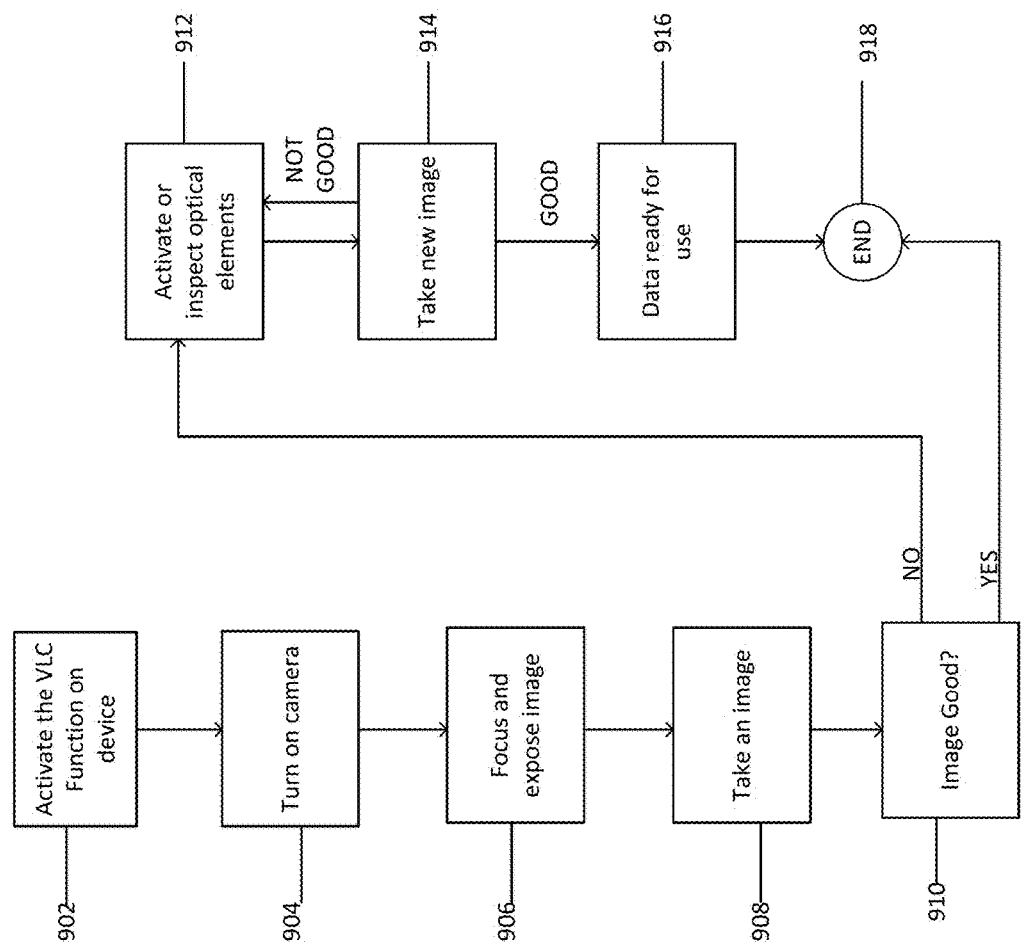
FIG. 9 is a flow chart illustrating a process for obtaining and analyzing a rolling shutter image of Visible Light Communication transmissions from a lighting device in the examples of FIGS. 8A, 8B and 8C.

FIG. 9 is a flow chart illustrating a process for obtaining and analyzing a rolling shutter image of Visible Light Communication (VLC) transmissions from a lighting device in the examples of FIGS. 8A, 8B and 8C.

In step 902, the lighting device 810 is a VLC enabled lighting device located in an indoor setting having low to dark surrounding lighting, for example, in a movie theater or building without power, or an outdoor setting having dusk or night lighting, for example, streetlights. The VLC function of the lighting device 810 is activated when information data is modulated and output from the lighting device 810. In steps 904 and 906, the camera 806 is turned on, and a setting, for example, a lens or shutter of the camera, is adjusted to obtain an image of the lighting device 810 arranged on, for example, pole 802. The camera 806 can be a standalone device or any mobile device including a camera.

In step 908, after the setting of the lens or shutter is adjusted to be in focus, an image of the lighting device 810 and VLC transmissions from the lighting device 810 is taken. In addition to the image of the lighting device 810 being taken, pertinent metadata contained in the image such as time, color, model, aperture value, brightness value, compass setting, location codes, accelerometer value, etc., of the camera may be recorded to aid in, for example, location analysis, maintenance, self-learning for future measurements and efficiency, or other communication application.

At step 910, a determination is made as to whether light output from the lighting device appears in the captured image and represents data of a size equal to a perimeter or frame of the lighting device and the predetermined number of bars for decoding and analysis. As discussed above with respect to FIGS. 2A, 2B, 8B, and 8C, when the frame of data containing the VLC transmission does not equal the frame of the lighting device and does not represent a predetermined number of bars of the captured image from the lighting device, i.e., the image data is too small to include the entire information data, or the image data expands outside the frame of the lighting device, then the representative image of the VLC visible light output is not good for detection or decoding, and proceed to step 912.

In step 912, to enlarge a captured image for data detection and analysis, scattering optics can be used to manipulate an image from the camera. For example, optical hardware or material may be used with the camera to cause a representative image of the VLC transmissions from the light source to be scattered, defocused and/or overexposed. Examples of optical hardware or materials that can be used to alter an image from the camera include, but are not limited to, a diffuser, lenslets, liquid crystal, diffraction gratings or similar techniques known in the art for scattering optics.

In step 914, a camera including the scattering optics hardware or materials is used to obtain a new captured image including the VLC transmissions from the lighting device 810. As discussed above with respect to FIGS. 2A, 2B, 8B and 8C, the new captured image is analyzed to determine whether data of the modulated visible light output included within the captured image represents at least a predetermined number of bars of the captured image from the lighting device. If NOT GOOD, i.e., the frame of data of the modulate visible light output is not equal to a perimeter or frame of the lighting device and does not represent at least the predetermined number of bars of the captured image (as illustrated in FIGS. 2B and 8B), then return to step 912 to further adjust the scattering optics of the camera. If YES, the frame of data of the modulated visible light output included within the captured image is equal to a perimeter or frame of the lighting device and represents at least the predetermined number of bars of the captured image from the lighting device (as illustrated in FIGS. 2A and 8C), then proceed to step 916.

In step 916, the frame of data of the modulated visible light output included within the captured image 810 is good, and the information data from the frame of data is ready for analysis and use. In an example, the decoded information data can be used to perform a computation to provide, for example, an informational message related to the surrounding area of the lighting device, estimate the location of the camera and/or mobile device or identify a lighting element needing maintenance. The process ends at step 918.

FIG. 10 illustrates an example of the optical effect of internal reflection of the lens utilized for Visible Light Communication (VLC) transmissions data detection from a rolling shutter image.

In FIG. 10, internal reflections of the lens of the camera cause multiple images to form. In particular, the upper boxes of FIG. 10 illustrate a light source 1000 (the darkest box) and its reflections inside the lens of a camera of, for example, a mobile device having a rolling shutter-type image sensor. The captured rolling shutter image of the light source and the internal reflections of the lens would be as illustrated in the bottom portion of FIG. 10. As discussed above, a modulation application running on the mobile device can be used for determination of the number of bars 1004 necessary to decode the modulated visible light output within the captured image 1006. In the illustrated example, the captured image 1006 of the light source and its internal reflections are a predetermined size such that a frame of data including the modulated visible light output is at least the predetermined number of bars (based upon the modulation application being used for decoding) of the captured image 1006. Thus, the modulated visible light output provided in the captured image is ready for use, for example, in location determination of the mobile device, providing informational messaging, or other communication application to the mobile device. If the modulated visible light output of the captured image did not include a full frame of data or complete code word of sufficient size of at least the predetermined number of bars of the captured image, then the processes described in FIGS. 7 and 9 can be used to adjust the image from the camera having the rolling shutter-type image sensor to obtain the information data from the modulated visible light output of the light source.

Figure 11B:
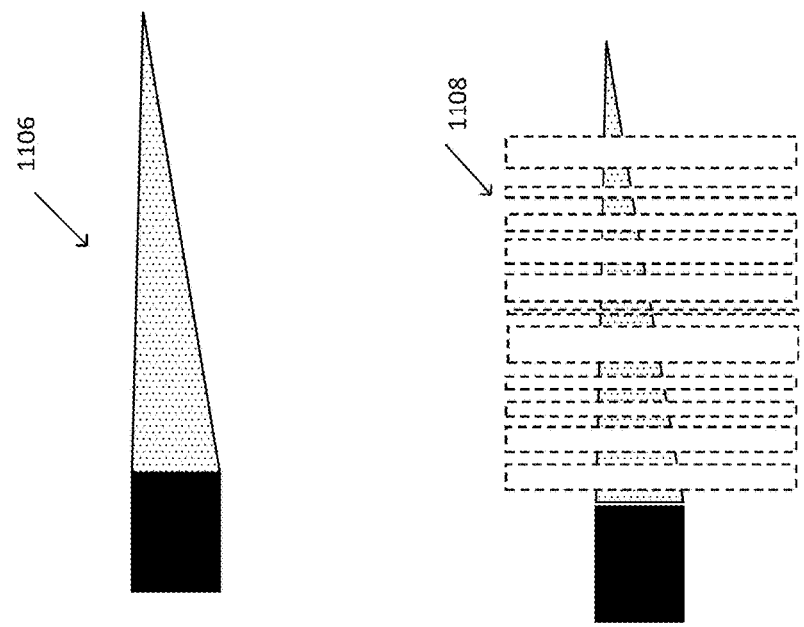
FIGS. 11A and 11B illustrate an example of the optical effect of starburst from the aperture of a camera utilized for Visible Light Communication data detection from a rolling shutter image.
Figure 11A:
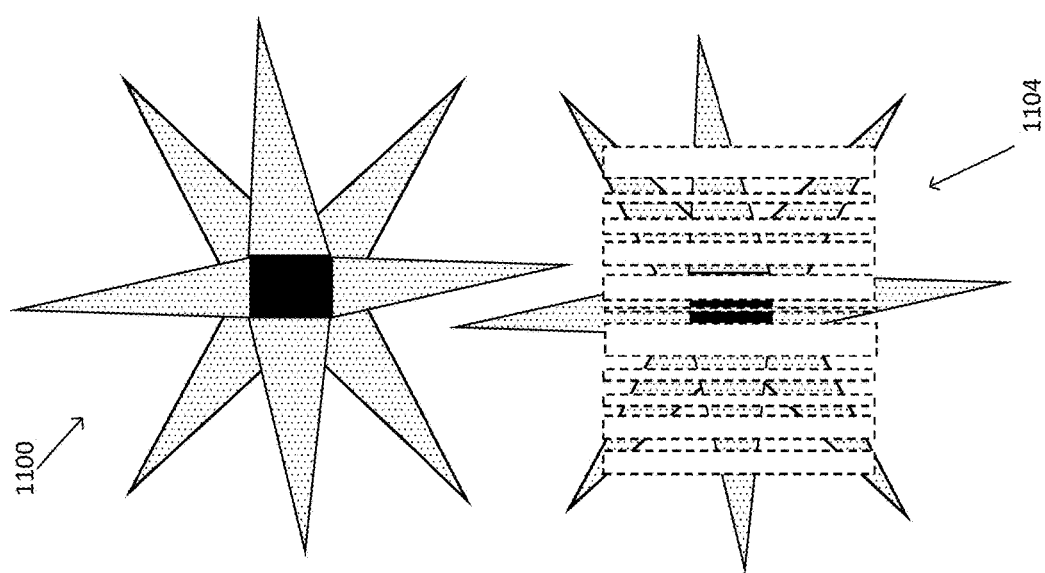

FIGS. 11A and 11B illustrate an example of the optical effect of starburst from the aperture of a camera utilized for Visible Light Communication data detection from a rolling shutter image.

In FIG. 11A depicts a starbust 1100 of, for example, a point source light at night or in a dark surrounding lighting setting. A starburst is a pattern of lines or rays radiating from a central object or source of light. The effect of a starburst is a visual artifact of an image caused by the optics of the camera which result in a smeared star-like effect of the image from the lighting device. The captured rolling shutter image of the VLC transmissions starburst of light within the frame of the lighting device and the predetermined number of bars of the captured image 1104 can be used for example, in location determination of the mobile device. FIG. 11B illustrates an enlarged view of a portion 1106 of the starburst 1100 of FIG. 11A. Specifically, the top portion of FIG. 11B represents the dark center portion and the horizontal extension from the center of FIG. 11A. The modulated visible light output portion of the captured image 1106 that is equal to a perimeter or frame of the lighting device from which the starburst is emitted and represents a predetermined number of bars of the captured image 1108 can be used, for example, in informational messaging or in location determination of the mobile device. If the data of the modulated visible light output included within the captured image is not a predetermined number of bars of the captured image, then the processes described in FIGS. 7 and 9 can be used to adjust the captured image from the camera having the rolling shutter-type image sensor to obtain the information necessary for example, location determination or data messaging.

FIGS. 12A and 12B illustrate an example of simultaneously obtaining rolling shutter images from multiple light sources, and determining whether the captured image data including the data of the modulated visible light output can be decoded.

In the illustrated example 1200 of FIG. 12A, multiple poles 1202 each have a lighting device arranged thereon. A mobile device including a camera 1204 having a rolling shutter-type image sensor is configured to capture an image containing lighting devices on the multiple poles 1202. The lighting devices on the multiple poles 1202 are VLC enabled lighting devices. Thus, a captured rolling shutter image containing the VLC transmissions from the multiple poles 1202 would appear as 1206 in FIG. 12B. The captured image 1206 of multiple light sources is useful in higher precision location determination. Using the above-described techniques for rolling shutter image detection and data analysis, settings of the camera, for example, lens or shutter settings, can be adjusted, when necessary, to cause the captured image to be scattered, blooming or blurred in order to enhance detection of the frame of data of the modulated visible light output included within the captured image from the lighting device.

Figures 13A, 13B, 13C:
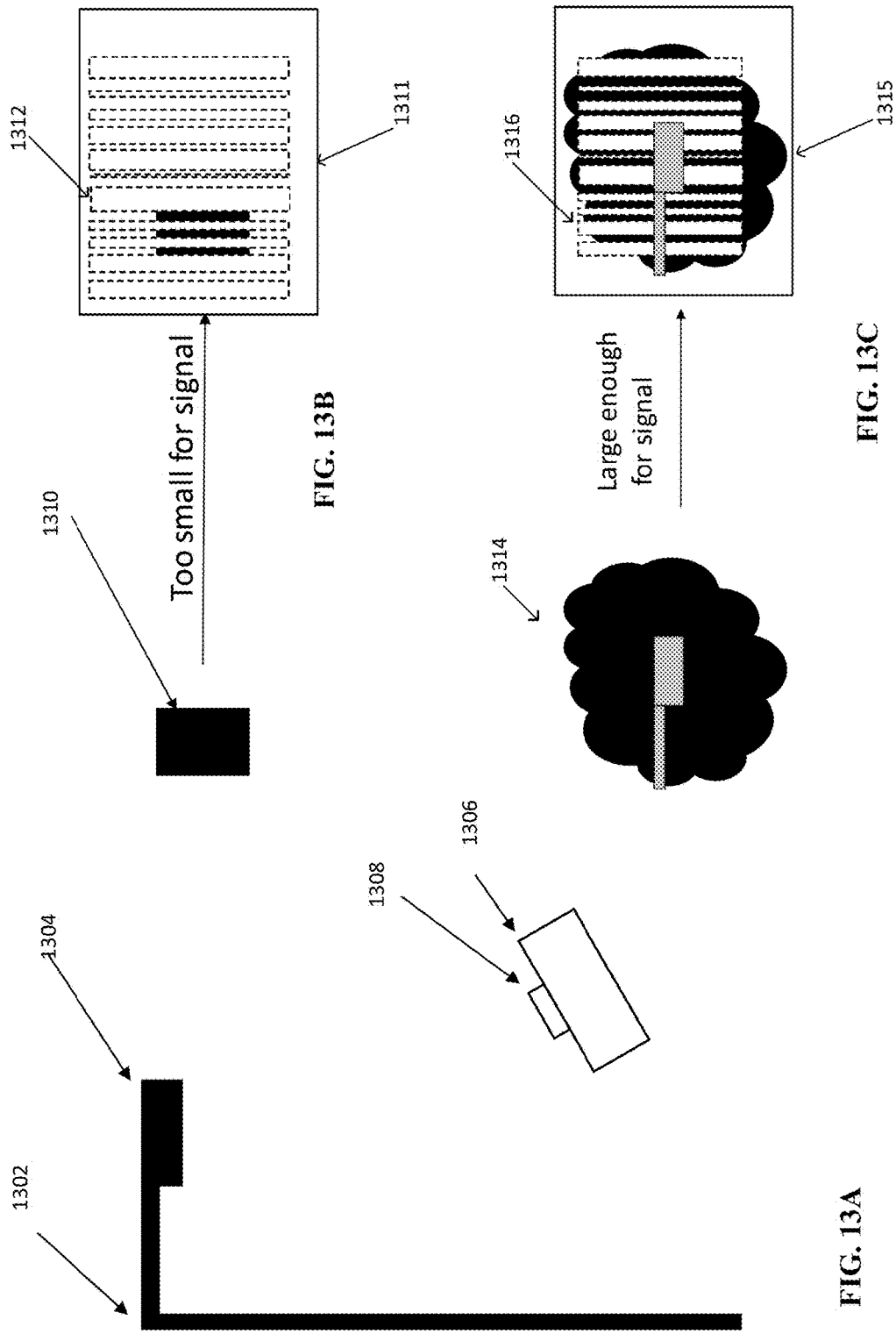
FIGS. 13A, 13B and 13C illustrate examples of the optical effect of scattering that causes haze and is utilized for Visible Light Communication data detection from a rolling shutter image.

FIGS. 13A, 13B and 13C illustrate examples of the optical effect of scattering that causes haze and is utilized for Visible Light Communication (VLC) data detection from a rolling shutter image.

FIG. 13A illustrates an example in which camera 1306, including a rolling shutter-type image sensor, obtains an image of a lighting device 1304 and modulated visible light output from the light source, for example, a streetlight, attached to a pole 1302. Internal scattering of a lens 1308 of the camera 1306 results in a haze output. Lighting device 1304 is, for example, a Visible Light Communication (VLC) enabled lighting device in an indoor or outdoor setting having low to dusk/night lighting. The camera 1306 may be any handheld mobile device such as a smart phone, laptop computer or tablet. The rolling shutter-type image sensor of the camera 1306 is configured to accommodate a modulation application running on the mobile device such as LUMI-CAST standard, which analyzes information from the image sensor to decode VLC transmissions captured as frames of data or code words from the lighting device 1304.

FIG. 13B illustrates an image 1310 from the image sensor of camera 1306. The image 1310 represents an example of when light output including modulated data from the lighting device 1304 is too small or a distance too far away from the camera 1306 for processing or decoding of the modulated data. As a result, the modulated visible light output contained in the rolling shutter image would be too small to include the complete data or code word from the lighting device 1304. The numbers of bars needed for decoding and decoding of the VLC transmissions are based upon, for example, a modulation application running on the mobile device such as VLC LUMICAST standard. As depicted in FIG. 13B, the rolling shutter image 1310 contains 3 bars 1312 of information in the image 1311; however, when using a modulation application such as LUMICAST, a frame of data and image size having 10 bars of information within the captured image 1311 would be needed. LUMICAST is used as an example of one modulation application that can be used for decoding the VLC transmissions. One of ordinary skill in the art would recognize that other applications may be used to decode the VLC transmissions and may have a different threshold of bars of information needed for decoding the VLC transmissions.

To remedy the example of FIG. 13B in which the data of the VLC transmission is too small (less than the size to decode a code word), it is necessary to enlarge the image representation of modulated visible light output from the lighting device that is captured by camera 1306. Techniques to enlarge a captured image having the modulated visible light output include, for example, adjusting elements of the camera so that the captured image is scattered, defocused, or overexposed to cause blooming. The blooming, in effect, enlarges the camera detector area which then enlarges the captured image. Other exemplary techniques that may be used to enlarge the image of the VLC transmissions include, but are not limited to, adjusting the focus of the camera 1306 so that the captured image is blurred, or changing the ISO setting, the sensitivity of the image sensor. For an example of capturing an image in a low surrounding lighting or dusk/dark environment, the ISO setting would be increased to allow faster shutter speeds of the camera. In the example of FIG. 13A in which scattering in the camera lens 1308 causes haze of the output from the camera, the data of the modulated visible light output that is used for the position determination or informational messaging is located in the haze or striped lines extending above, below and around the captured image of the lighting device 1304.

FIG. 13C illustrates an example in which the captured image 1314 from camera 1306 is enlarged by blooming or blurring such the full frame 1315 of data or complete code word of the VLC transmissions from the lighting device 1304 are predetermined number of bars 1316, and the information used, for example, in location determination or messaging, surrounds the image of the light device, i.e., is contained in the haze from the camera lens. More specifically, the modulated data is superimposed over the lighting device. Therefore, it is possible to obtain from the decoded data, for example, barcode information that is physically on the lighting device and encoded information from the modulated data. Accordingly, the data of the VLC transmissions are in the striped bars of the frame 1316 that are above and below the image of the lighting device.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   an intelligent lighting device, comprising:
      a light source; and
      logic/processing circuitry coupled to the light source to cause and control modulation of visible light output of the light source to carry information; and
   a mobile device coupled to or including an image sensor to control image sensor operation and to obtain image data from the image sensor, the mobile device comprising:
      a processor; and memory coupled to be accessible to the processor, wherein the memory stores programming for execution by the processor and data to be saved or processed by the processor during execution of instructions included in the programming, wherein execution of the programming configures the processor to control the image sensor to perform image capture functions, wherein the image capture functions include:
operating the image sensor to capture a rolling shutter image including an image representation of the intelligent lighting device and the modulated visible light output of the light source; and operating the processor to:
receive the image data of the captured rolling shutter image from the image sensor;
analyze the image data including the modulated visible light output of the light source to determine whether the modulated visible light output within the captured rolling shutter image is a predetermined size;
adjust, when the modulated visible light output is not the predetermined size, a setting of the image sensor to cause a new captured rolling shutter image from the image sensor to be scattered, defocused or overexposed such that the modulated visible light output from the light source is at least the predetermined size; and
process the analyzed data representing the modulated visible light output of the at least predetermined size within the new captured image to decode the information from the modulated visible light output.

2. The system of claim 1, further comprising:
a data network configured to enable data communication within a premises and to provide data communication access to a wide area network extending outside the premises; and
a plurality of communication interfaces each configured to enable communication via a link to the data network.

3. The system of claim 1, wherein the logic/processing circuitry implements a pulse width modulation (PWM) light modulation technique to cause modulation of the visible light output of the light source.

4. The system of claim 1, wherein the mobile device coupled to or including the image sensor further includes at least one of optical hardware or material to cause scattering of the captured image including the modulated visible light output from the light source.

5. The system of claim 1, wherein a pattern of the light output from the light source is a starburst.

6. The system of claim 1, wherein the predetermined size is a measurement in which the image data of the captured rolling shutter image is equal to a perimeter of a fixture of the lighting device and the modulated visible light output within the capture rolling shutter image includes a full frame of data.

7. The system of claim 2, further comprising a server coupled to communicate via one of the plurality of communication interfaces and the data network, and configured as a data source during processing of the data from the captured rolling shutter image.

8. The system of claim 4, wherein execution of the programming in the memory by the processor further configures the processor of the mobile device to perform additional functions to adjust a captured rolling shutter image when the captured modulated visible light output of the light source is determined to not be the predetermined size, including functions to modify settings of at least one of the optical hardware or material of the mobile device to cause the new captured rolling shutter image from the image sensor to be scattered, defocused or overexposed such that the modulated visible light output from the light source is at least the predetermined size within the new captured image to decode the information from the modulated visible light output.

9. The system of claim 6, wherein the image data of the modulated visible light output not the predetermined size includes a determination of at least one of the image data of the captured rolling shutter image being less than or greater than a perimeter of the fixture of the lighting device or the modulated visible light input within the captured rolling shutter image not including a full frame of data.

10. The system of claim 9, wherein the adjusting, when the image data of the modulated visible light output is not the predetermined size, causes the new captured rolling shutter image to be greater than the perimeter of the fixture of the lighting device.

11. A method, comprising:
operating a mobile device coupled to or including an image sensor to capture a rolling shutter image representation of an intelligent lighting device and modulated visible light output of a light source carrying information;
receiving, by a processor of the mobile device, image data of the captured rolling shutter image from the image sensor;
analyzing the received image data including the modulated visible light output of the light source to determine whether the modulated visible light output within the captured rolling shutter image is a predetermined size;
adjusting, when the image data of the modulated visible light output is not the predetermined size, a setting of the image sensor to cause a new captured rolling shutter image from the image sensor to be scattered, defocused or overexposed such that a portion of the new captured rolling shutter image representing image data of the modulated visible light output from the light source is at least the predetermined size; and
processing the analyzed image data representing the modulated visible light output of the at least predetermined size within the new captured image to decode the information from the modulated visible light output.

12. The method of claim 11, wherein the adjusting, when the image data of the modulated visible light output is not the predetermined size, further comprises modifying a setting of at least one of optical hardware or material of the mobile device associated with the image sensor to cause scattering of the new captured rolling shutter image including the image data of the modulated light output from the light source.

13. The method of claim 11, wherein the predetermined size is a measurement in which the image data of the captured rolling shutter image is equal to a perimeter of a fixture of the lighting device and the modulated visible light output within the capture rolling shutter image includes a full frame of data.

14. The method of claim 11, wherein operating the mobile device coupled to or including the image sensor to capture the rolling shutter image of the intelligent lighting device and the modulated visible light output of the light source occurs in one of an outdoor setting having surrounding light of minimal brightness or an outdoor setting having dusk or nighttime lighting.

15. The method of claim 11, wherein the modulated visible light output of the light source is modulated using a pulse width modulation (PWM) light modulation technique.

16. The method of claim 13, wherein the image data of the modulated visible light output not the predetermined size includes a determination of at least one of the image data of the captured rolling shutter image being less than or greater than a perimeter of the fixture of the lighting device or the modulated visible light input within the captured rolling shutter image not including a full frame of data.

17. The method of claim 16, wherein the adjusting, when the image data of the modulated visible light output is not the predetermined size, causes the new captured rolling shutter image to be greater than the perimeter of the fixture of the lighting device.

18. A portable device, comprising:
an image sensor;
a processor coupled to the image sensor to control image sensor operation and to receive image data from the image sensor;
memory coupled to be accessible to the processor, wherein the memory stores programming for execution by the processor and data to be saved or processed by the processor during execution of instructions included in the programming,
wherein execution of the programming configures the processor to control the image sensor to perform image capture functions,
wherein the image capture functions include:
operating the image sensor to capture a rolling shutter image including an image representation of an intelligent lighting device including a light source configured to provide a modulated visible light output carrying information data, and the modulated visible light output from the light source; and
operating the processor to:
receive the image data of the captured rolling shutter image from the image sensor;
analyze the image data including the modulated visible light output of the light source to determine whether the modulated visible light output within the captured rolling shutter image is a predetermined size;
adjust, when the modulated visible light output is not the predetermined size within the captured rolling shutter image, a setting of at least one of a lens or a shutter of the image sensor to cause a new captured rolling shutter image from the image sensor to be scattered, defocused or overexposed such that the modulated visible light output from the light source is the at least predetermined size; and
processing the analyzed image data representing the modulated visible light output of the at least predetermined size within the new captured image to decode the information from the modulated visible light output.

19. The portable device of claim 18, further comprising a network interface coupled to the processor and configured to provide data communications via a data communications network.

20. The portable device of claim 18, further comprising at least one of optical hardware or material to cause scattering of the captured image including the modulated visible light output from the light source.

21. The portable device of claim 20, wherein execution of the programming in the memory by the processor further configures the processor of the portable device to perform additional functions to adjust the captured rolling shutter image when the modulated visible light output within the captured image from the light source is determined to not be the predetermined size, including functions to modify settings of at least one of the optical hardware or material to cause a new captured rolling shutter image from the image sensor to be scattered, defocused or overexposed such that the modulated visible light output within the new captured image is the at least predetermined size to decode the information data from the modulated visible light output.

22. The portable device of claim 18, wherein a pattern of the light output from the light source is a starburst.

* * * * *